(12) United States Patent
Ott

(10) Patent No.: US 11,837,785 B2
(45) Date of Patent: Dec. 5, 2023

(54) HOLOGRAPHIC ANTENNA AND HOLOGRAPHIC ANTENNA ARRANGEMENT

(71) Applicant: Sony Group Corporation, Tokyo (JP)

(72) Inventor: Arndt Thomas Ott, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 9 days.

(21) Appl. No.: 17/443,461

(22) Filed: Jul. 27, 2021

(65) Prior Publication Data
US 2022/0045436 A1  Feb. 10, 2022

(30) Foreign Application Priority Data
Aug. 4, 2020 (EP) ..................................... 20189432

(51) Int. Cl.
*H01Q 19/06* (2006.01)
*H01Q 19/30* (2006.01)
*H01Q 3/44* (2006.01)
*H01Q 1/48* (2006.01)
*H01Q 3/26* (2006.01)
(Continued)

(52) U.S. Cl.
CPC ............ *H01Q 19/067* (2013.01); *H01Q 1/48* (2013.01); *H01Q 3/2694* (2013.01); *H01Q 3/44* (2013.01); *H01Q 19/30* (2013.01); *G03H 5/00* (2013.01); *H01Q 23/00* (2013.01)

(58) Field of Classification Search
CPC ...... H01Q 19/067; H01Q 1/48; H01Q 3/2694; H01Q 3/44; H01Q 19/30; H01Q 23/00; G03H 5/00
See application file for complete search history.

(56) References Cited

U.S. PATENT DOCUMENTS

| 6,150,974 A | 11/2000 | Tasaka et al. |
| 10,236,574 B2 * | 3/2019 | Chen ................. H02J 50/23 |
| 10,418,721 B2 * | 9/2019 | Chattopadhyay ...... H01Q 13/20 |

(Continued)

FOREIGN PATENT DOCUMENTS

WO  2015/126550 A1  8/2015

OTHER PUBLICATIONS

Gabor, "A New Microscopic Principle", Nature Publishing Group, vol. 161, May 15, 1948, pp. 777-778.
(Continued)

*Primary Examiner* — Ricardo I Magallanes
*Assistant Examiner* — Yonchan J Kim
(74) *Attorney, Agent, or Firm* — XSENSUS LLP

(57) ABSTRACT

A holographic antenna comprises an optically transparent substrate; a hologram arranged on a first surface of the substrate, the hologram comprising two or more hologram stripes, each having a plurality of linearly arranged hologram pixels, each comprising a switching component; a ground plane arranged on a second surface, opposite the first surface, of the substrate; one or more surface wave launchers arranged on or in a surface of the substrate, the one or more surface wave launchers being configured to feed a feeding signal in a frequency range above 50 GHz into the hologram; and control lines connected to the switching components of the hologram pixels for controlling the hologram pixels individually or in groups.

19 Claims, 26 Drawing Sheets

(51) Int. Cl.
*H01Q 23/00* (2006.01)
*G03H 5/00* (2006.01)

(56) References Cited

U.S. PATENT DOCUMENTS

| | | | |
|---|---|---|---|
| 2012/0256811 A1* | 10/2012 | Colburn | H01Q 15/141 |
| | | | 343/907 |
| 2015/0009071 A1* | 1/2015 | Gregoire | H01Q 3/443 |
| | | | 342/372 |
| 2015/0145748 A1* | 5/2015 | Gregoire | H01Q 9/30 |
| | | | 343/895 |
| 2016/0211906 A1* | 7/2016 | Woodsum | H04B 1/16 |
| 2017/0016990 A1 | 1/2017 | Yaacobi et al. | |
| 2017/0170572 A1 | 6/2017 | Severson et al. | |
| 2017/0331186 A1 | 11/2017 | Linn et al. | |
| 2019/0089305 A1* | 3/2019 | Linn | H01Q 3/005 |
| 2020/0083605 A1 | 3/2020 | Quarfoth et al. | |
| 2022/0278449 A1* | 9/2022 | Sazegar | A61B 17/32002 |

OTHER PUBLICATIONS

Pei et al., "AlGaN/GaN HEMT With a Transparent Gate Electrode", IEEE Electron Device Letters, vol. 30, No. 5, May 2009, pp. 439-441.
Guan et al., "Antennas Made of Transparent Conductive Films", Piers Online, vol. 4, No. 1, 2008, pp. 116-120.
Beer et al., "Two-Dimensional Beam Steering Based on the Principle of Holographic Antennas" IEEE, Mar. 2011, pp. 210-213.
Farhat, "Holographically Steered Millimeter Wave Antennas", IEEE Transactions on Antennas and Propagation, vol. 28, No. 4, Jul. 1980, pp. 476-480.
Chen et al., "Transparent Metal Oxide Nanowire Transistors", Nanoscale, The Royal Society of Chemistry, vol. 4, Apr. 2012, pp. 3001-3012.
Rusch, "Holographic Antennas", Springer Science+Business Media, 2016, pp. 2689-2725.
Schäfer et al., "On-Chip Millimeter Wave Surface Wave Launcher for Off-Chip Leaky Wave Antennas", Proceedings of the 48th European Microwave Conference, Sep. 25-27, 2018, pp. 1113-1116.
Larocca et al., "Millimeter-Wave CMOS Digital Controlled Artificial Dielectric Differential Mode Transmission Lines for Reconfigurable ICs", In IEEE MTT-S International Microwave Symposium digest. IEEE MTT-S International Microwave Symposium, Jul. 2008, pp. 181-184.

* cited by examiner

HOLOGRAPHIC ANTENNA AND HOLOGRAPHIC ANTENNA ARRANGEMENT

CROSS-REFERENCE TO RELATED APPLICATION

The present application claims priority to EP 20189432.6, filed Aug. 4, 2020, the entire contents of which is incorporated herein by reference.

BACKGROUND

Field of the Disclosure

The present disclosure relates to a holographic antenna and a holographic antenna arrangement.

Description of Related Art

A relatively large antenna area is required for mm-wave systems covering a frequency range above 100 GHz, in particular between 100 GHz and 300 GHz, compared to Lidar or camera systems. To achieve compact system integration an optically transparent antenna offers system integration of infrared systems behind the antenna. Furthermore, solar energy harvesting can be applied if the antenna area is optically transparent. Conventional transparent antennas are formed by optical transparent nanowires. However, the conventional solutions are too lossy if applied for mm-wave antennas at frequencies above 100 GHz.

Holographic antennas have been intensively studied in the past, e.g. in Rusch C. (2016) Holographic Antennas. In: Chen Z., Liu D., Nakano H., Qing X., Zwick T. (eds) Handbook of Antenna Technologies. Springer, Singapore. Holographic antennas are quite attractive for mm-wave applications as lossy feed networks are avoided. Further, due to the fact that the wave is guided inside the dielectric layer metallic losses are negligible for holographic antennas. However, the known concepts are limited to frequency-based beam scanning in one dimension.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to provide a holographic antenna and a holographic antenna arrangement that offer two-dimensional beam steering.

According to an aspect there is provided a holographic antenna comprising:
- an optically transparent substrate;
- a hologram arranged on a first surface of the substrate, the hologram comprising two or more hologram stripes, each having a plurality of linearly arranged hologram pixels, each comprising a switching component;
- a ground plane arranged on a second surface, opposite the first surface, of the substrate;
- one or more surface wave launchers arranged on or in a surface of the substrate, the one or more surface wave launchers being configured to feed a feeding signal in a frequency range above 50 GHz into the hologram; and
- control lines connected to the switching components of the hologram pixels for controlling the hologram pixels individually or in groups.

According to a further aspect there is provided a holographic antenna arrangement comprising:
- a holographic antenna as disclosed herein;
- a sensing device arranged on the side of the ground plane facing away from the substrate; and
- a controller configured to provide control signals for controlling the switching components and the surface wave launchers.

Embodiments are defined in the dependent claims. It shall be understood that the disclosed holographic antenna arrangement has similar and/or identical further embodiments as the claimed holographic antenna and as defined in the dependent claims and/or disclosed herein.

One of the aspects of the disclosure is to enable two-dimensional beam steering by using a transparent holographic antenna. Steering in the first dimension is achieved by applying a phased array antenna (the surface wave launcher) for feed wave launching. The feed wave may be created by multiple planar structures like Vivaldi antennas. The hologram comprises a plurality of individual hologram pixels. Switching components, e.g. mm-wave switches, are employed to turn on and off the hologram pixels individually or in groups. Activation of dedicated hologram pixels enables beam steering in the second dimension.

An optically transparent holographic antenna is a low cost beam steering antenna solution. In this context, optically transparent shall be understood as transparent or semi-transparent in the visible and/or infrared range. The disclosed solution provides a high system integration as an additional component like a solar energy harvesting system, a Lidar (radar), or vision system (camera), in particular an optical sensing device or an infrared sensing device, can be placed behind the antenna thus forming the holographic antenna arrangement.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
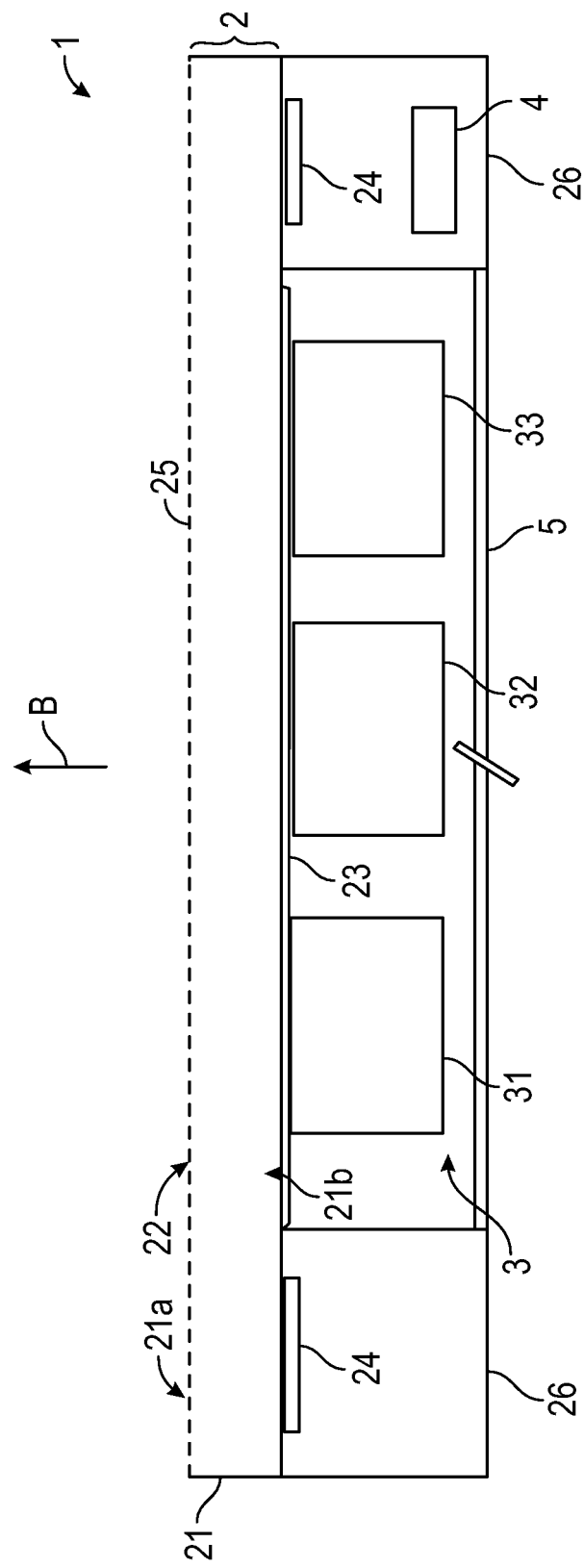
FIG. 1 shows a schematic diagram of an embodiment of a holographic antenna arrangement according to the present disclosure.

Referring now to the drawings, wherein like reference numerals designate identical or corresponding parts throughout the several views, FIG. 1 shows a schematic diagram of an embodiment of a holographic antenna arrangement 1 according to the present disclosure. The holographic antenna arrangement 1 comprises a holographic antenna 2, one or more sensing device 3 (such as a camera 31, a radar 32, a solar energy harvesting device 33, an optical sensing device, a lidar, and an infrared sensing device) and a controller 4. The holographic antenna 2 comprises an optically transparent substrate 21 (e.g. a transparent glass core), a hologram 22, a ground plane 23, two (in general, two or more) surface wave launchers 24 and control lines 25.

The hologram 22 is arranged on a first surface 21a (in FIG. 1 the top) of the substrate 21. It comprises two or more hologram stripes, each having a plurality of linearly arranged hologram pixels (not shown in FIG. 1), each comprising a switching component (not shown in FIG. 1). The ground plane 23 is arranged on a second surface 21b (in FIG. 1 the bottom), opposite the first surface 21a, of the substrate 21.

The two surface wave launchers 24 are arranged on or in a surface 21a of the substrate 21 on different sides of the hologram 22 (in FIG. 1 on the left and right side of the hologram 22). The surface wave launchers 24 are configured to feed a feeding signal in a frequency range above 50 GHz into the hologram 22. Each of the surface wave launchers may comprise one or more surface wave launcher elements, e.g. antennas, i.e. each of the surface wave launchers may be an array of multiple antennas. In other embodiments only one surface wave launcher 24 is provided. Two synchronized surface wave launchers, however, reduce frequency squinting effects (i.e. variation of the main radiation direction over frequency).

The control lines 25 are connected to the switching components of the hologram pixels for controlling the hologram pixels individually or in groups.

Ground plane 23 and hologram 22 may be made of optical transparent nanowire technology like Indium Tin Oxide (ITO). Hence, the different (e.g. infrared) devices 3 like cameras, lidars, or solar energy harvesting systems can be placed behind the hologram 22, i.e. on the side of the ground plane 23 facing away from the substrate 21. Wideband operation with a constant radiation pattern in boresight direction B is achieved if waves are launched from the two sides (left and right).

Two millimeter wave integrated circuits (ICs) 26 may be mounted on the bottom side 21b of the substrate 21. The millimeter wave ICs 26 may be synchronized with each other, e.g. via IF signal lines 5. The surface wave launchers 24 may be embedded on the ICs 26. In other embodiments, the surface wave launchers 24 may be realized either on the top or bottom surface 21a, 21b of the substrate 21. In a particular implementation an array of Vivaldi antennas may be used as surface wave launcher to form a planar wave front. The thickness of the substrate 21 is chosen to support the TE1 mode. In general, any other antenna topologies like dipoles or Yagi antenna configurations may be used as surface wave launchers.

The controller 4 is configured to provide control signals for controlling the switching components of the hologram 22 and the surface wave launchers 24 of the holographic antenna.

In most radio frequency wave guides the electrical field lines are vanishing on the metallic layers. Due to the dielectric waveguide configuration the field carrying the highest energy is oriented parallel to the hologram. In an ITO antenna realization, the realized gain is only 0.2 dB lower compared to the same antenna made of copper. It is worth to notice that the conductor loss of ITO is much larger than that of copper.

Figure 2:
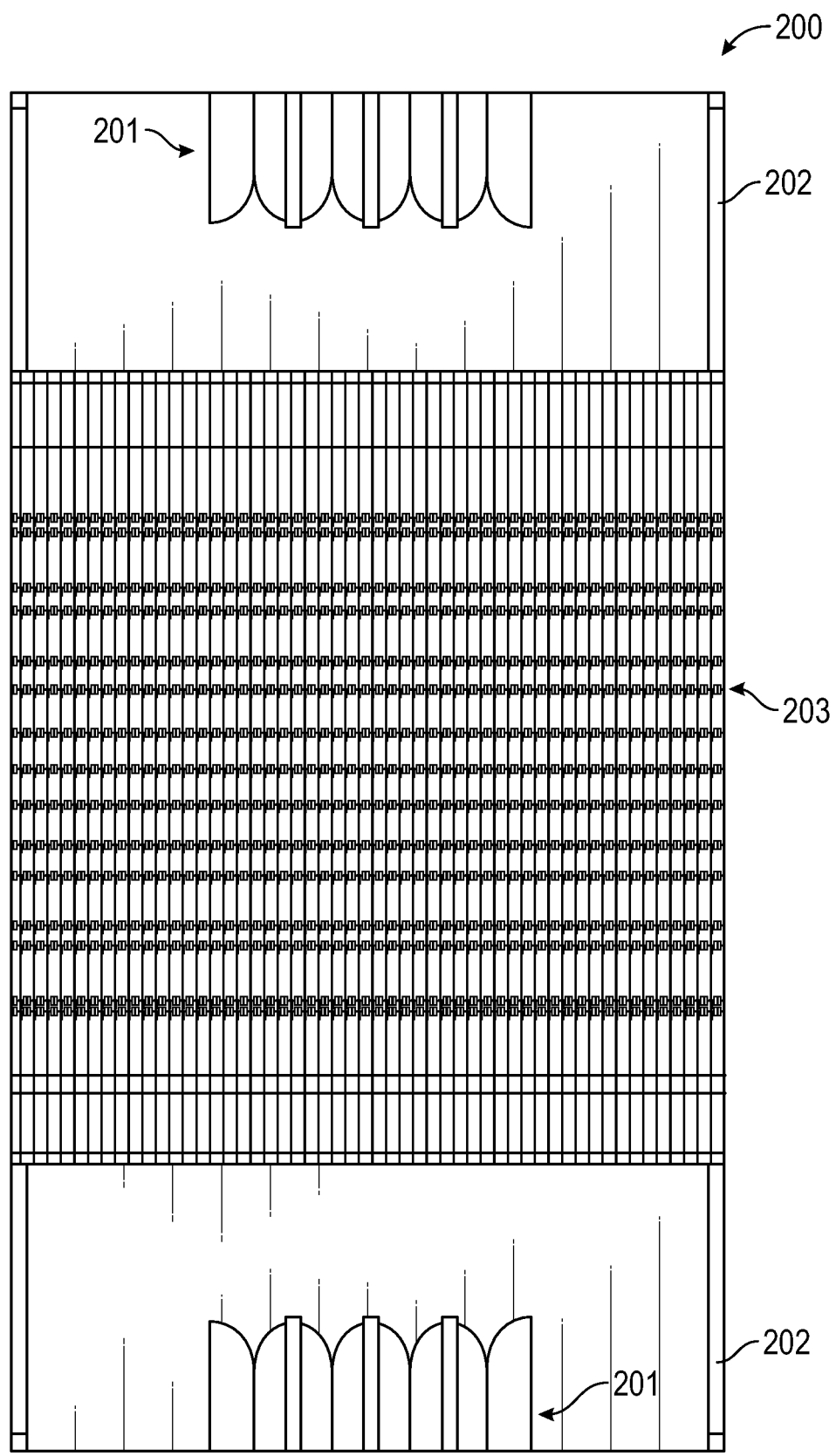
FIG. 2 shows a schematic diagram of an embodiment of a holographic antenna 200 according to the present disclosure.

FIG. 2 shows a schematic diagram of an embodiment of a holographic antenna 200 according to the present disclosure. Four Vivaldi antennas 201 on every IC feed the hologram 203 from two sides. The hologram and the ICs are connected via power and ground connections 202 and via holes. The Vivaldi antennas 201 form two phased arrays which are launching almost planar wave fronts on the hologram 203. By applying consecutive phase shift on the Vivaldi antennas 201 beam steering in one direction is possible.

Two (or more) different holograms with different spacing may be realized on the top layer of the substrate. The shape of the hologram corresponds to the interference pattern of the reference wave launched by the Vivaldi antennas 201 and the radiated wave. Due to the assumption of a planar wave front straight conducting lines oriented in parallel to each other may be applied. A first hologram is designed to radiate in boresight direction and a second hologram is designed to point the beam into a second dimension. Switching between both holograms changes the beam pointing direction on the fly.

Digitally controlled hologram stripes can be used according to an embodiment of the present disclosure. MOS (metal oxide semiconductor) switches, realized e.g. by one or more transistors, may be applied to turn on and off the digitally controlled hologram stripes, each comprising a number of hologram pixels. Various embodiments for realizing switches for switching individual hologram pixels or groups of hologram pixels on and off will be described in the following.

Figure 3A:
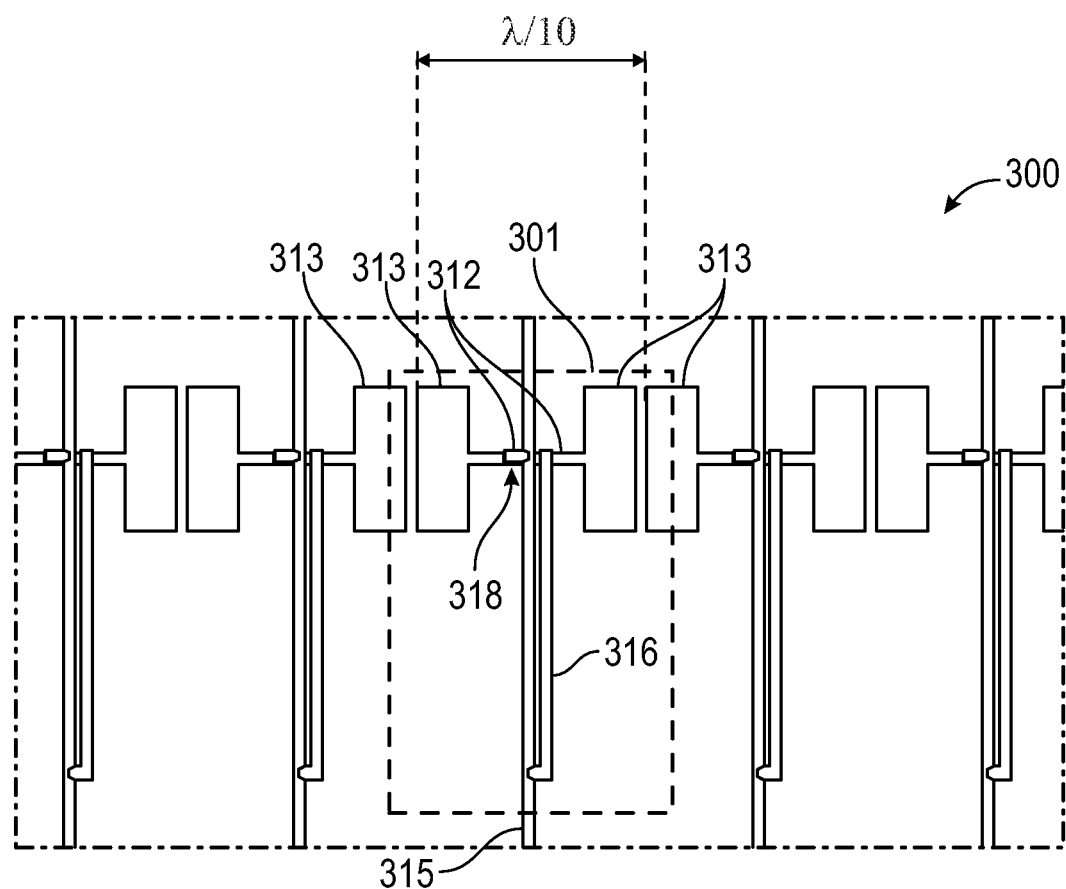
FIG. 3A shows a small part of a digitally controlled hologram stripe according to the present disclosure.

FIG. 3A shows a small part of the digitally controlled hologram stripe 300 according to the present disclosure. The digitally controlled hologram stripe 300 comprises many small hologram pixels 301, which are capacitive coupled with each other. The capacitor values are chosen to form a millimeter wave short circuit. An active switch network is applied in the center of the pixel to turn the pixel on and off.

Figure 3B:
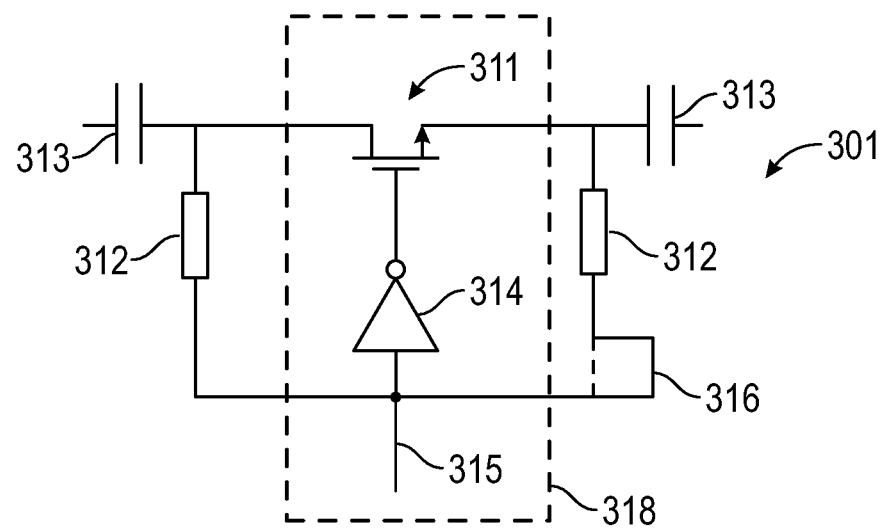
FIG. 3B shows a circuit diagram of an embodiment of a hologram pixel according to the present disclosure.

FIG. 3B shows a circuit diagram (equivalent circuit) of an embodiment of a hologram pixel 301 according to the present disclosure. Drain and source of a metal oxide metal transistor 311, representing a switch, are biased with resistors 312 having values in the order of tens of kOhm. Capacitors 313 are provided for capacitive coupling to the neighboring pixels. An inverter 314 is coupled with its input to the resistors and with its output to the gate of the transistor 311. A control line 315 is connected to the input of the inverter to provide a control signal for switching the pixel on and off. An optional delay line 316 may be coupled in the line between one of the resistors 312 and the input of the inverter 314. Via the control line 315 a control signal is provided to turn on and off individual pixels or pixels in groups, e.g. all pixels of a hologram stripe simultaneously.

FIGS. 3A and 3B show how the equivalent circuit shown in FIG. 3B translates into an electromagnetic model and hologram pixel. The transistor component 318 is not shown in FIG. 3A as the transistors are much smaller compared to the size of the hologram pixel. The position of the transistor component is only indicated in FIG. 3A. Supply voltages and GND connections are not shown in this simplified electromagnetic model as they do not have an impact on the electromagnetic properties.

Figure 4A:
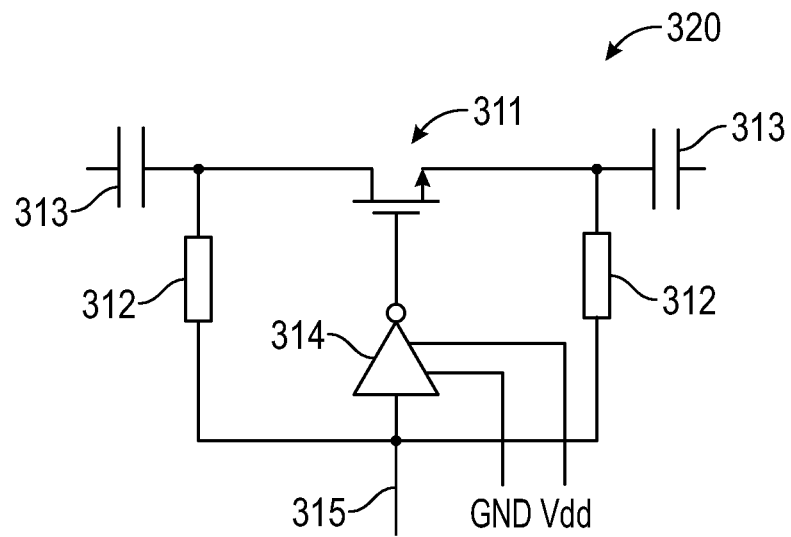
FIG. 4A shows a circuit diagram of an embodiment of a hologram pixel according to the present disclosure.
Figure 4B:
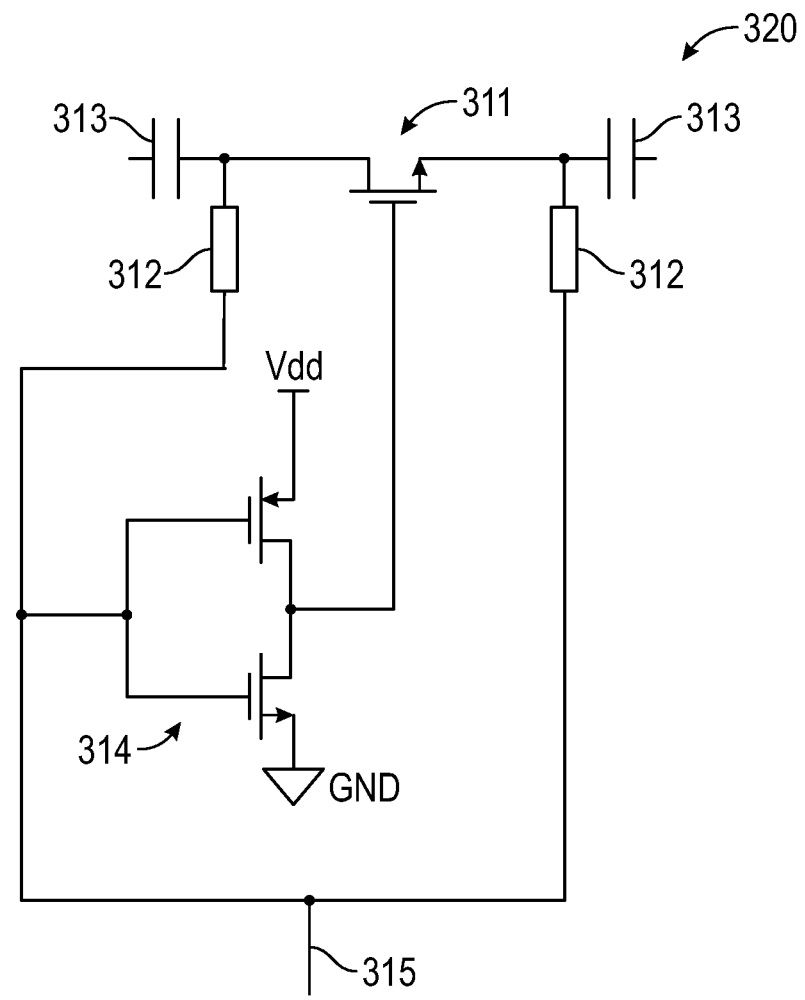
FIG. 4B shows a circuit diagram of an embodiment of a hologram pixel according to the present disclosure.

FIG. 4 shows a circuit diagram of an embodiment of a hologram pixel 320 as an equivalent circuit (FIG. 4A) and a more detailed implementation (FIG. 4B). The control line 315 biases source and drain of the transistor switch 311. The transistor gate is driven by a complementary voltage level as an inverter 314 is placed between the control line 315 and transistor gate. Three lines including reference voltage (Vdd), ground (GND) and control line 315 are used to operate the switch 311. The capacitors 313 block DC signals and provide a short circuit for millimeter wave signals. The particular advantages of this embodiment are a symmetrical layout of the transistor and a stable operation. In a simple example, e.g. if only a few fixed holographic patterns are used, activation of said hologram stripes may be achieved by turning the supply voltage on and off.

Figure 5A:
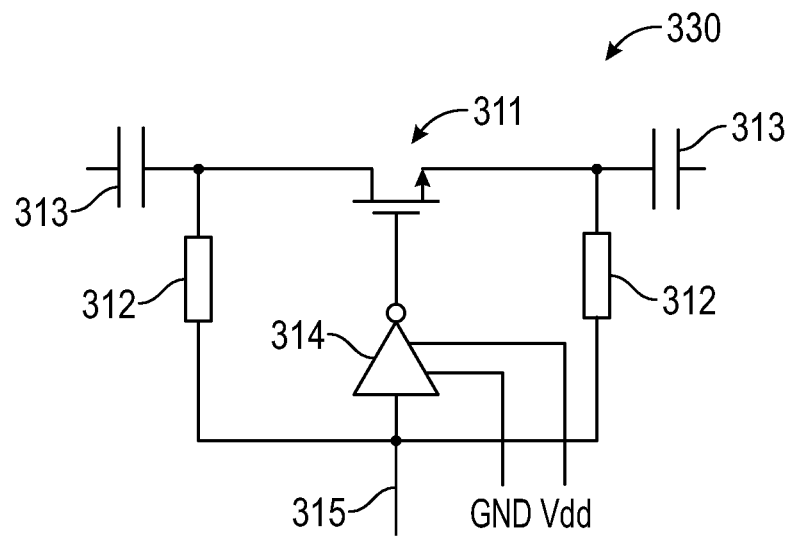
FIG. 5A shows a circuit diagram of another embodiment of a hologram pixel according to the present disclosure.
Figure 5B:
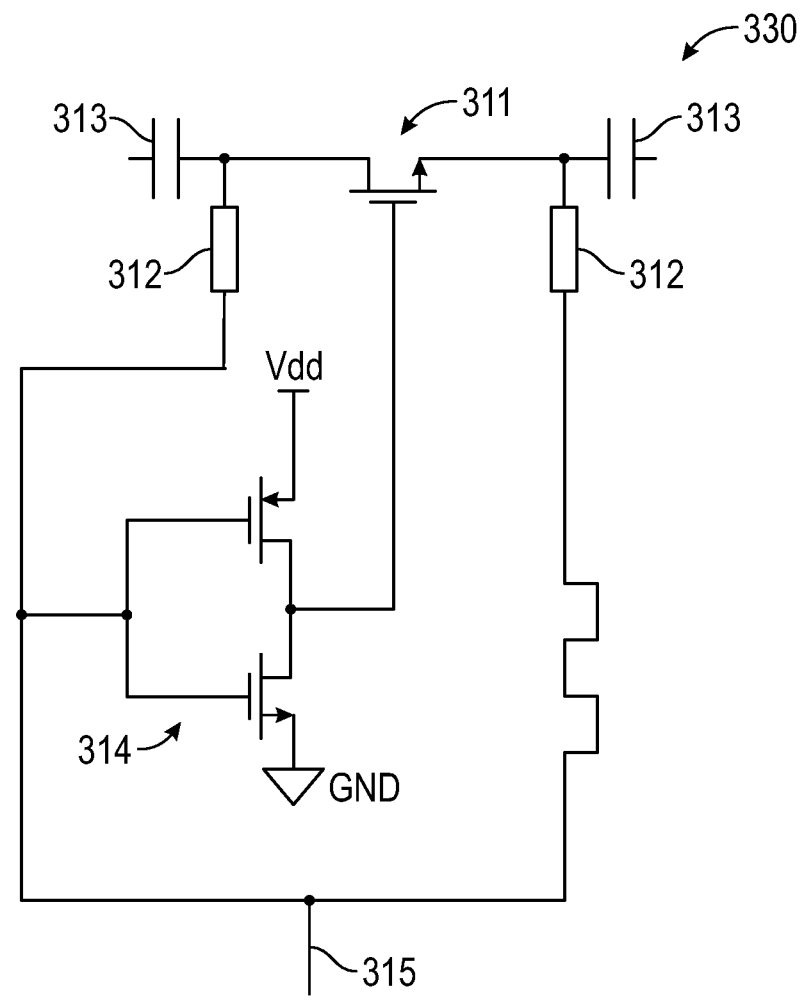
FIG. 5B shows a circuit diagram of another embodiment of a hologram pixel according to the present disclosure.

FIG. 5 shows a circuit diagram of another embodiment of a hologram pixel 330 as an equivalent circuit (FIG. 5A) and a more detailed implementation (FIG. 5B). This embodiment is substantially identical to the embodiment shown in FIG. 4 except for an additional delay line 316 in one bias path. The length of the delay line 316 corresponds to half a wavelength and cancels mm-wave signals on the DC path. The particular advantages of this embodiment are a symmetrical layout of the transistor, a stable operation and the cancellation of waves on the DC path.

Figure 6A:
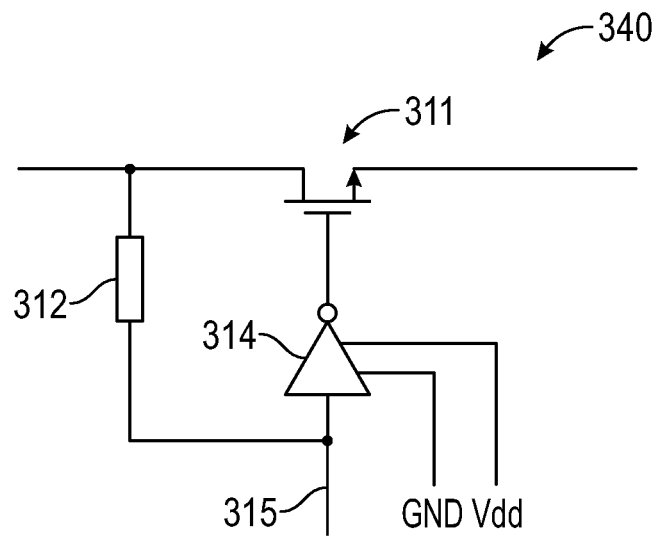
FIG. 6A shows a circuit diagram of another embodiment of a hologram pixel according to the present disclosure.
Figure 6B:
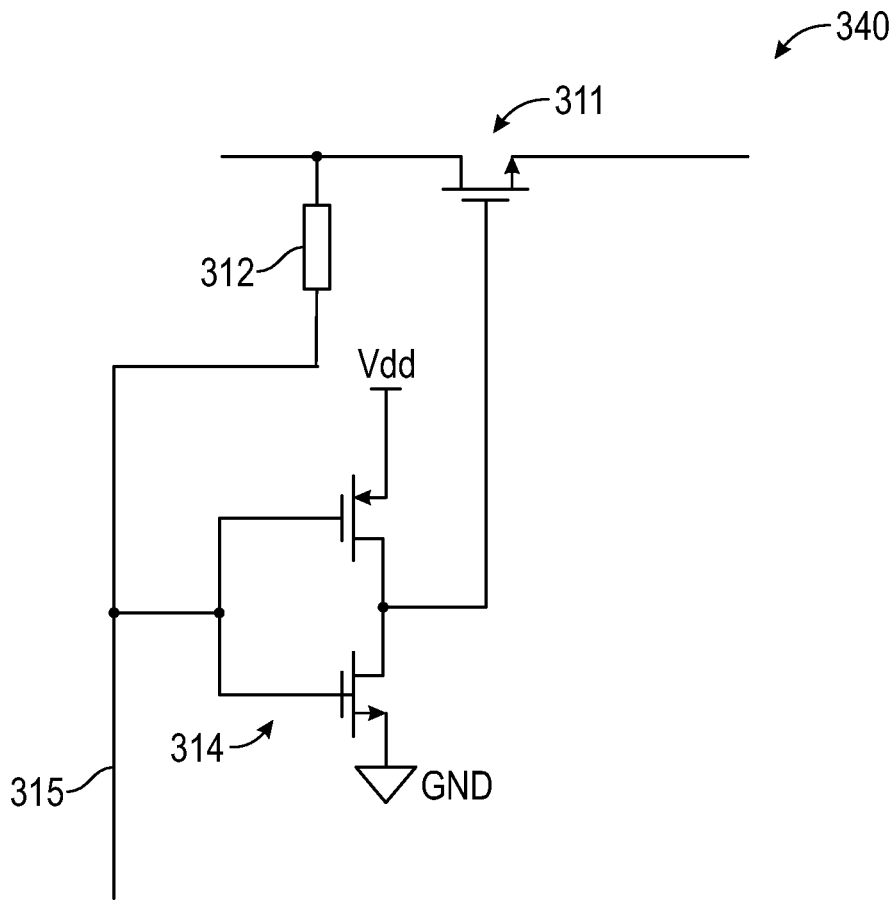
FIG. 6B shows a circuit diagram of another embodiment of a hologram pixel according to the present disclosure.

FIG. 6 shows a circuit diagram of another embodiment of a hologram pixel 340 as an equivalent circuit (FIG. 6A) and a more detailed implementation (FIG. 6B). In this embodiment direct connection between all hologram pixels exists on the hologram. Therefore, only one connection from the control line 315 to either the source or drain of the transistor 311 is needed. The neighboring switch accomplishes the other connection. The particular advantages of this embodiment are that no capacitors are needed on the hologram (providing more design options an enabling a denser pattern) and a lower number of resistors and interface lines is required.

Figure 7A:
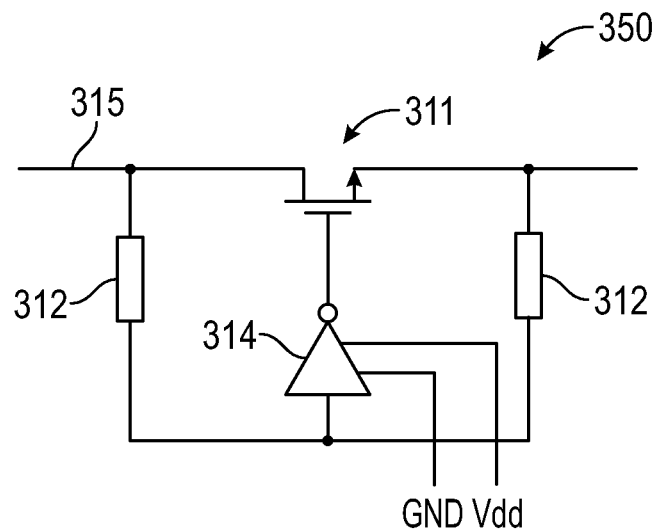
FIG. 7A shows a circuit diagram of another embodiment of a hologram pixel according to the present disclosure.
Figure 7B:
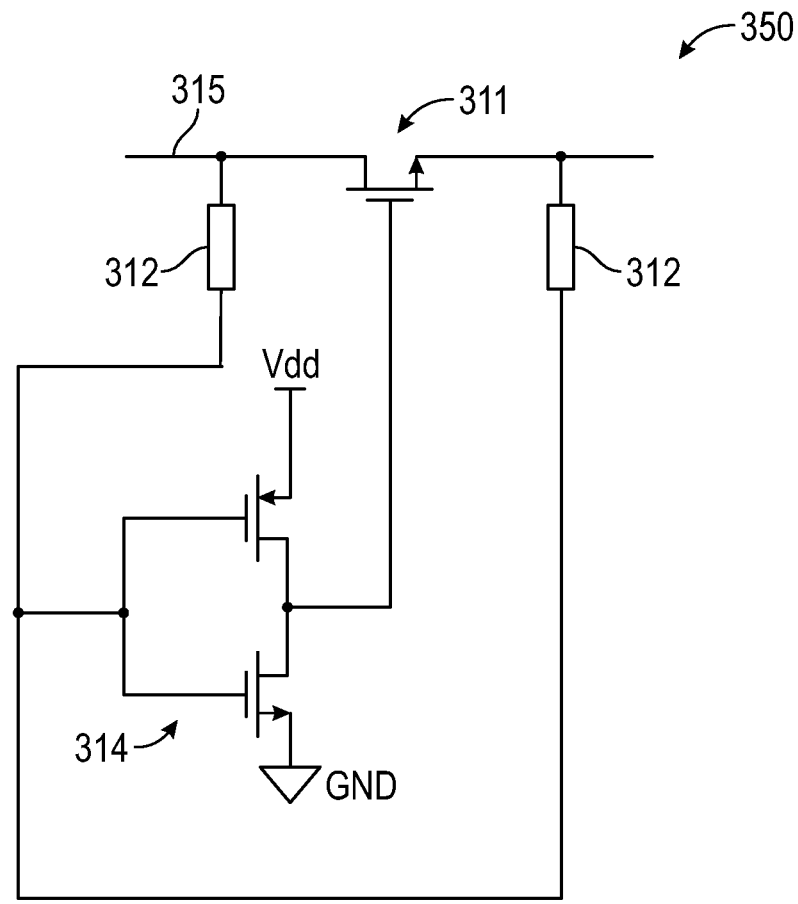
FIG. 7B shows a circuit diagram of another embodiment of a hologram pixel according to the present disclosure.

FIG. 7 shows a circuit diagram of another embodiment of a hologram pixel 350 as an equivalent circuit (FIG. 7A) and a more detailed implementation (FIG. 7B). In this embodiment the hologram stripe carries the control signal. A direct connection exists between the input of the inverter 314 and the hologram stripe. Resistors 312 are placed in between to block RF signals. The hologram stripes can be easily accessed from the side. Hence, this configuration is perfectly suited for dense hologram configurations. The particular advantages of this embodiment are that the control line is part of the hologram and can be turned on an off from the corner of the antenna, a much higher number of hologram stripes is possible and all hologram pixels can be turned on and off at the same time.

Figure 8:
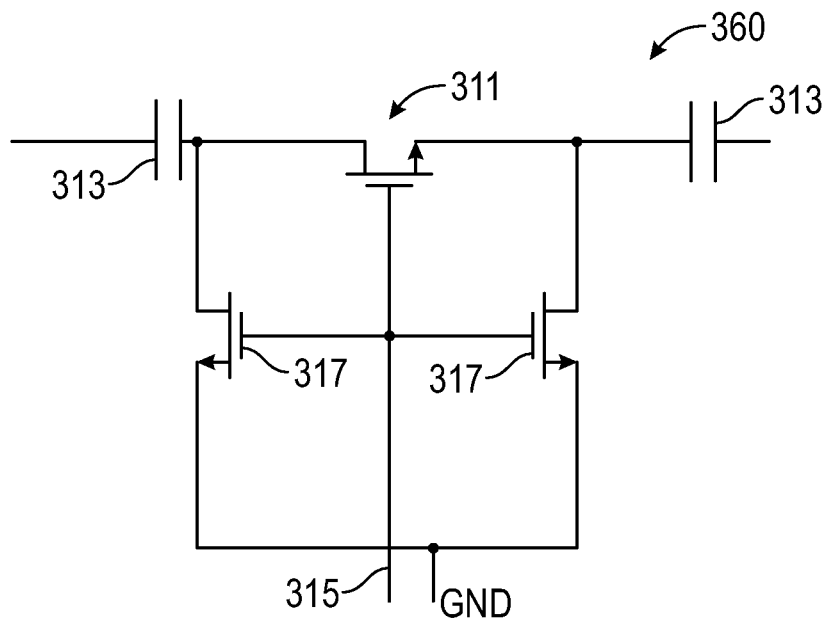
FIG. 8 shows a circuit diagram of another embodiment of a hologram pixel according to the present disclosure.

FIG. 8 shows a circuit diagram of another embodiment of a hologram pixel 360. This embodiment requires only a control line 315 and GND connection. In an implementation nMOS transistors 317 (generally, transistors with the same n or p doping as the transistor switch 311) in combination with a GND connection are used. If a high state is applied on the control line 315 all transistor switches 311 and 317 are closed. The capacitors 313 block DC signals and provide a short circuit for millimeter wave signals. The particular advantage of this embodiment is that the Vdd power supply line is eliminated.

Figure 9:
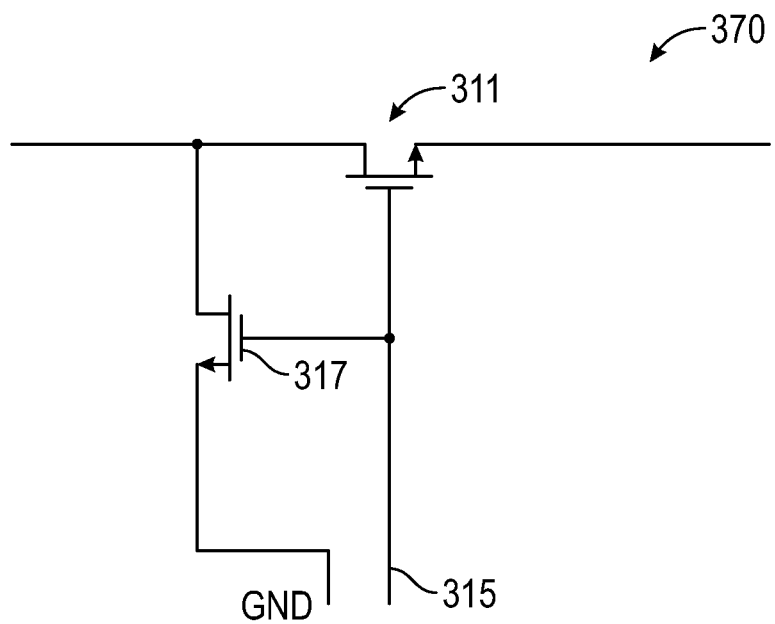
FIG. 9 shows a circuit diagram of another embodiment of a hologram pixel according to the present disclosure.

FIG. 9 shows a circuit diagram of another embodiment of a hologram pixel 370. Again, the capacitors are removed and a direct connection between switches on the hologram is achieved. Hence, one transistor 317 provides GND connection for drain output and source input of different switches. The particular advantages of this embodiment are that the Vdd power supply line is eliminated, no capacitors are needed on the hologram (providing more design options an enabling a denser pattern) and a lower number of resistors and interface lines is required.

Figure 10A:
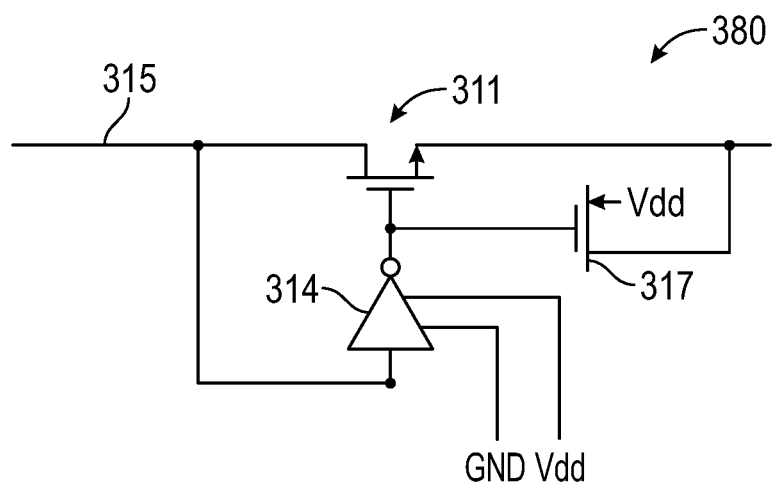
FIG. 10A shows a circuit diagram of another embodiment of a hologram pixel according to the present disclosure.
Figure 10B:
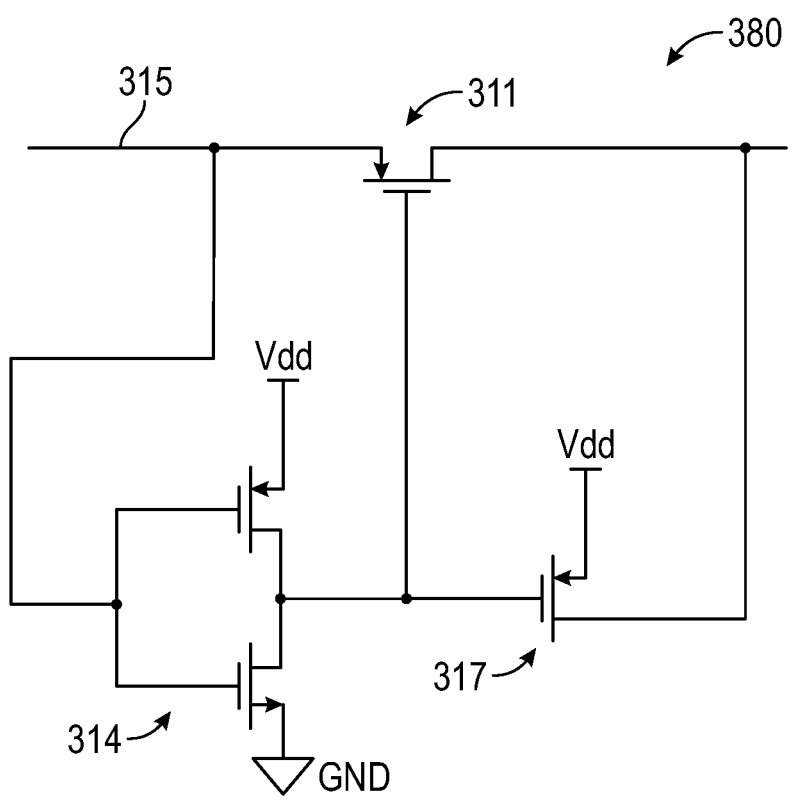
FIG. 10B shows a circuit diagram of another embodiment of a hologram pixel according to the present disclosure.

FIG. 10 shows a circuit diagram of another embodiment of a hologram pixel 380 as an equivalent circuit (FIG. 10A) and a more detailed implementation (FIG. 10B). In this embodiment the hologram stripe carries the control signal. An inverter 314 provides the gate signals for the switch 311 and a transistor 317 in the bias circuit. The transistors and switches can be placed on multiple transistor layers. The multiple transistor layers ensure proper routing of the signal and DC connections for all transistors. The particular advantages of this embodiment are that the control line is part of the hologram and can be turned on and off from the corner of the antenna, a much higher number of hologram stripes is possible and all hologram pixels can be turned on and off at the same time.

Figure 11:
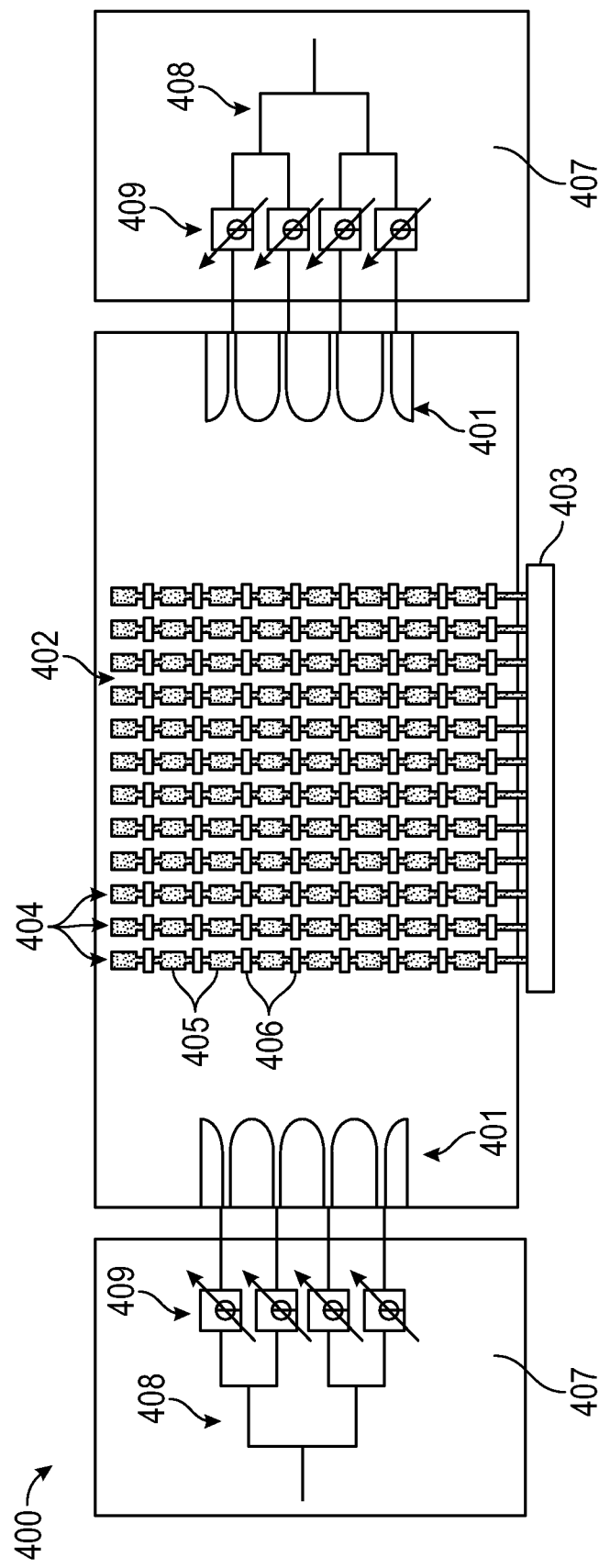
FIG. 11 shows a schematic diagram of an embodiment of the design of the holographic antenna according to the present disclosure

FIG. 11 shows a schematic diagram of an embodiment of the design of the holographic antenna 400 according to the present disclosure. It shows two Vivaldi feed arrays 401, the hologram 402 and the controller 403. The Vivaldi feed arrays 401 act as surface wave launchers to launch surface waves into the hologram 402. The hologram 402 comprises twelve hologram stripes 404, each comprising eight hologram pixels 405 and eight respective transistor switches 406 (in realistic implementations the number of hologram stripes and/or hologram pixels per hologram stripe may be much larger; for illustrative purposes a lower number is shown in FIG. 11). The controller 403, which may be part of the holographic antenna 400 or external from the holographic antenna 404, e.g. as part of the holographic antenna arrangement. FIG. 11 further shows two ICs (electronic devices) 407 including dividers/combiners 408 and phase shifters 409 connected to the Vivaldi feed antenna arrays 401.

Figure 12A:
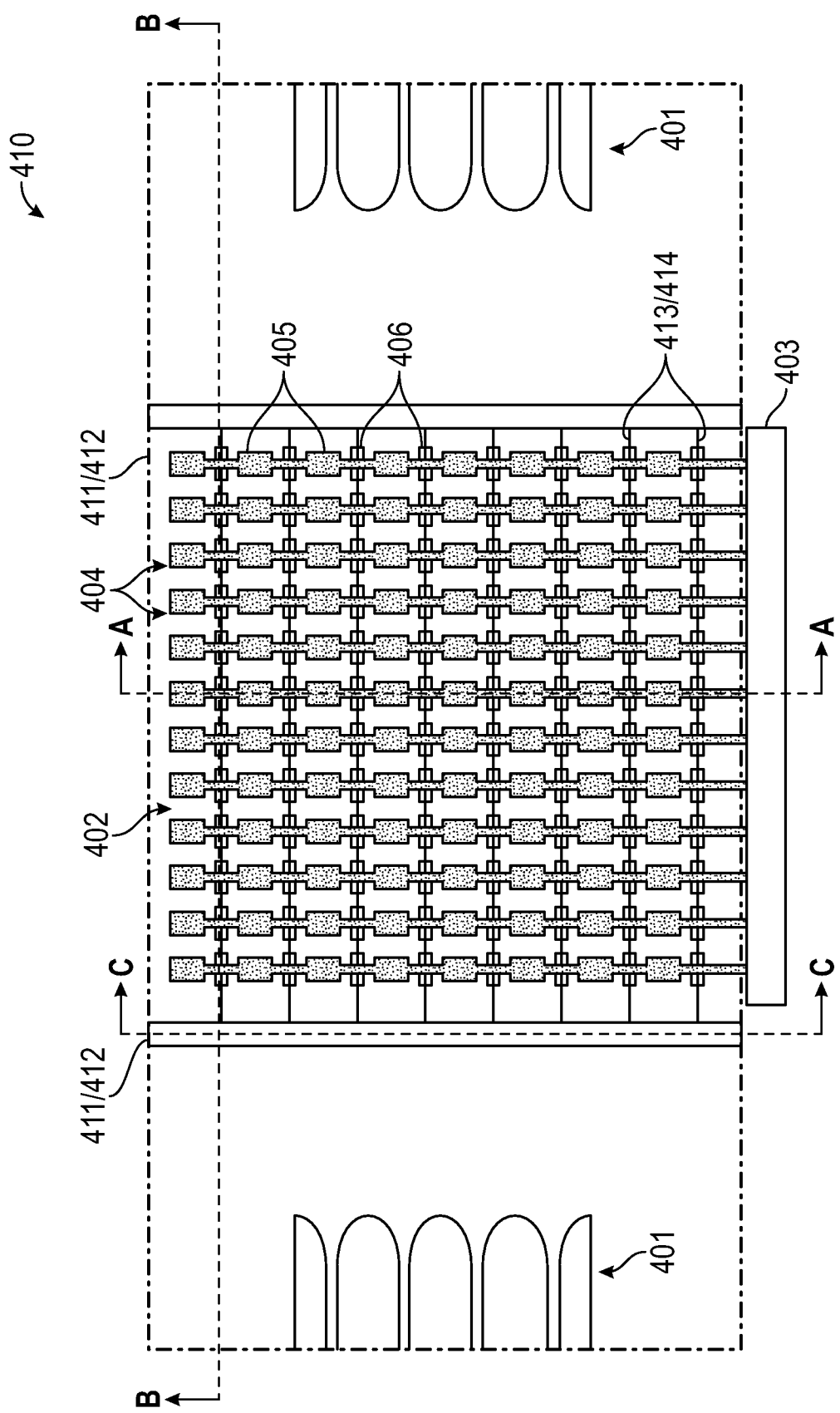
FIG. 12A shows a schematic diagram of another embodiment of the design of the holographic antenna according to the present disclosure.
Figure 12B:
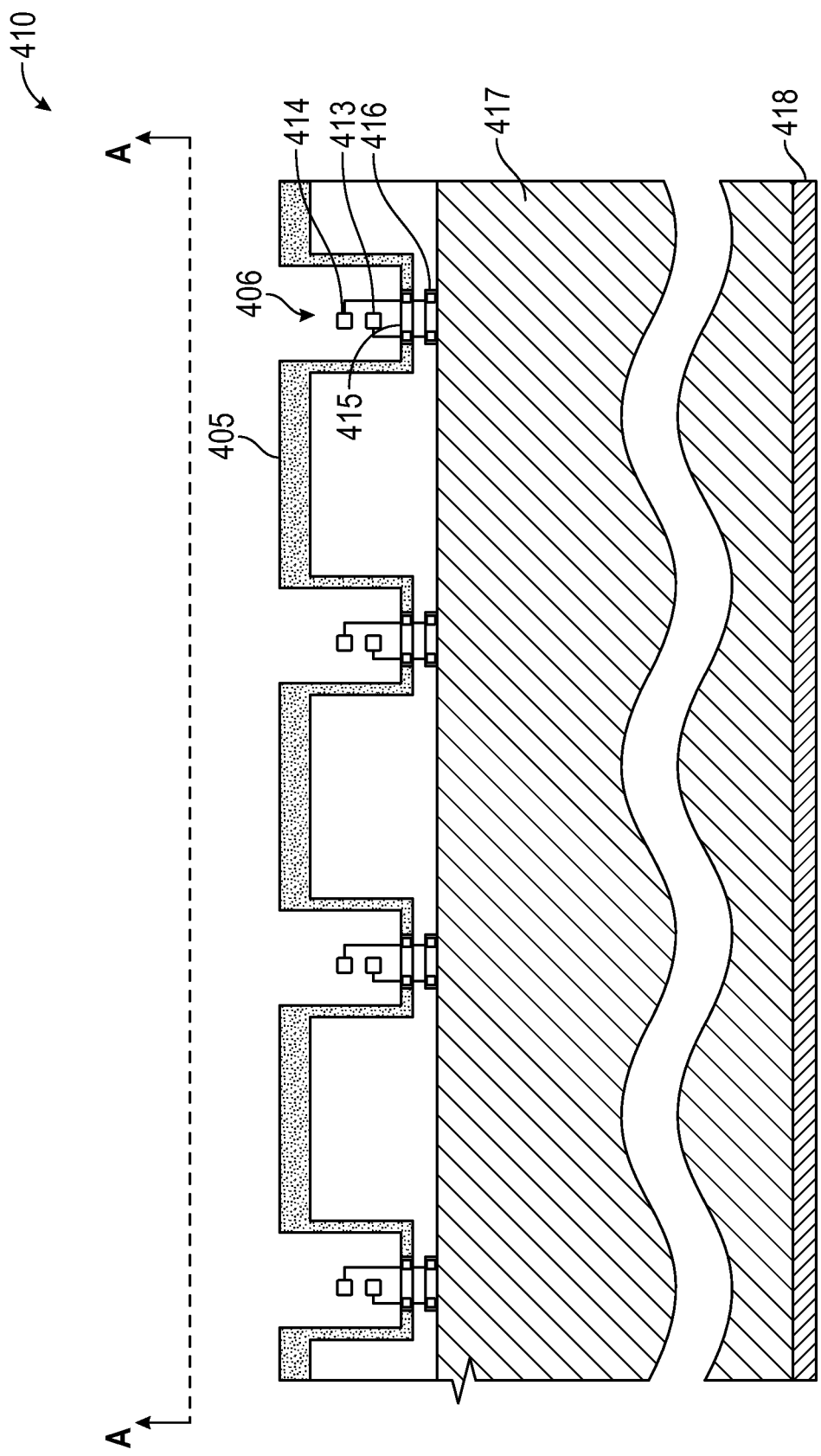
FIG. 12B shows a schematic diagram of another embodiment of the design of the holographic antenna according to the present disclosure.
Figure 12C:
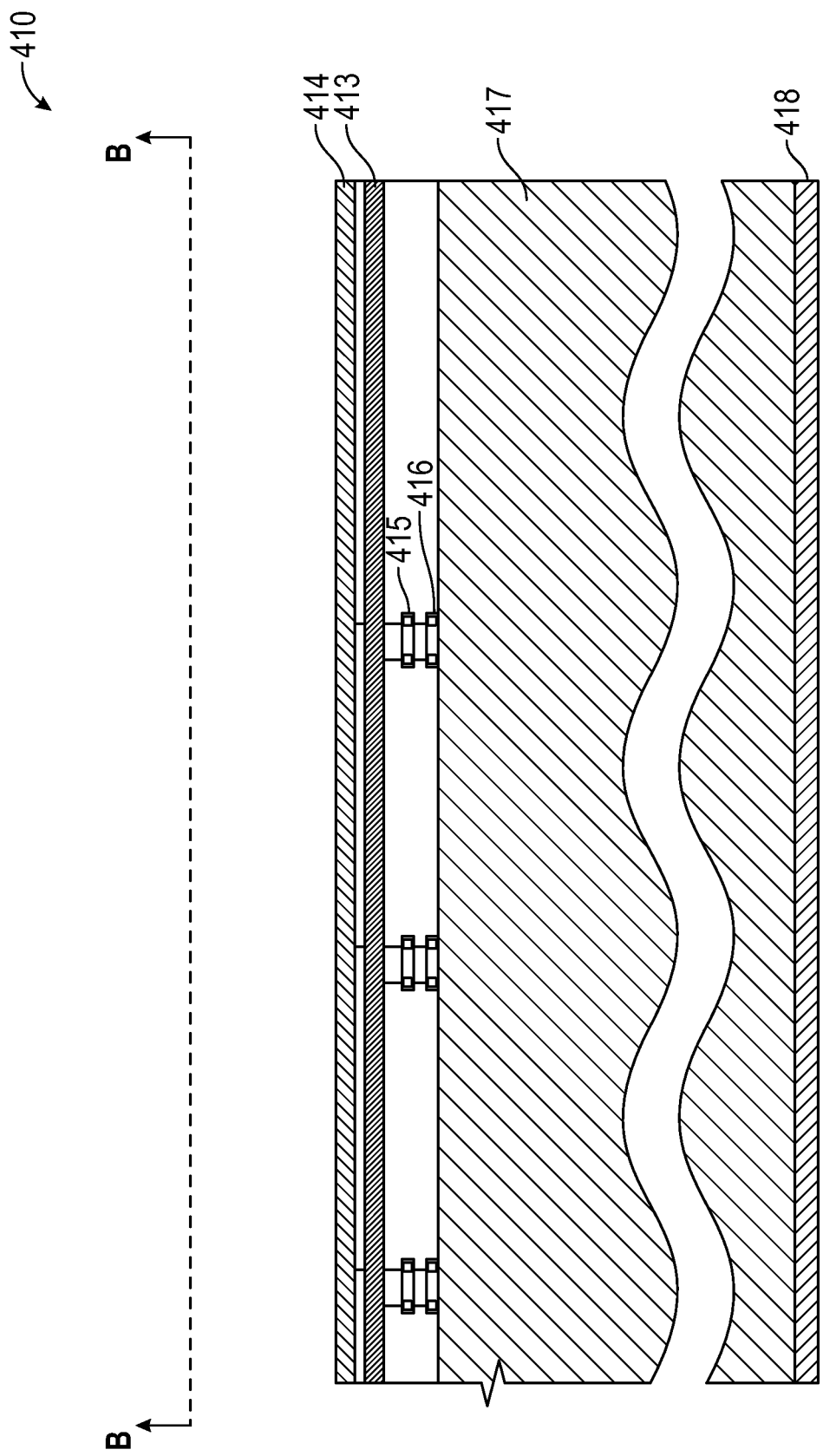
FIG. 12C shows a schematic diagram of another embodiment of the design of the holographic antenna according to the present disclosure.
Figure 12D:
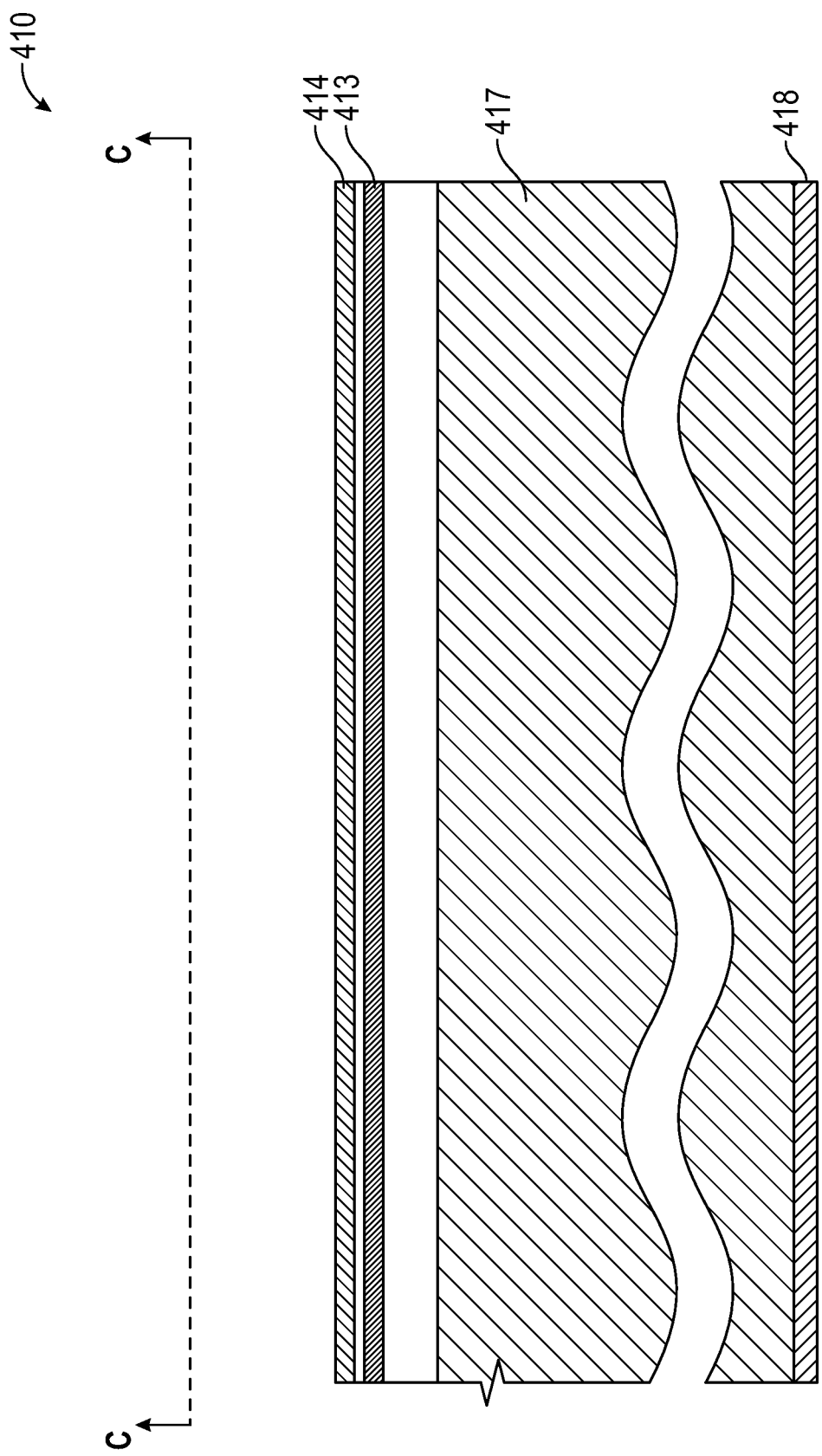
FIG. 12D shows a schematic diagram of another embodiment of the design of the holographic antenna according to the present disclosure.

FIG. 12 shows a schematic diagram of another embodiment of the design of the holographic antenna 410 according to the present disclosure, wherein FIG. 12A shows a top view, FIG. 12B shows a cross-sectional view along A-A, FIG. 12C shows a cross-sectional view along B-B, and FIG. 12D shows a cross-sectional view along C-C. In addition to the elements of the holographic antenna 400 shown in FIG. 11, a ground layer 411, a bias (Vdd) layer 412 and interconnect bias lines 413, 414 to every transistor switch 406 are provided. There are two (or more) transistor layer 415 and 416 arranged on top of the substrate 417, which are connected via a first interconnect bias line 413 to ground layer 411 and via a second interconnect bias line 414 to bias layer 412. Another ground layer 418 is arranged on the bottom of the substrate layer 417.

Figure 13A:
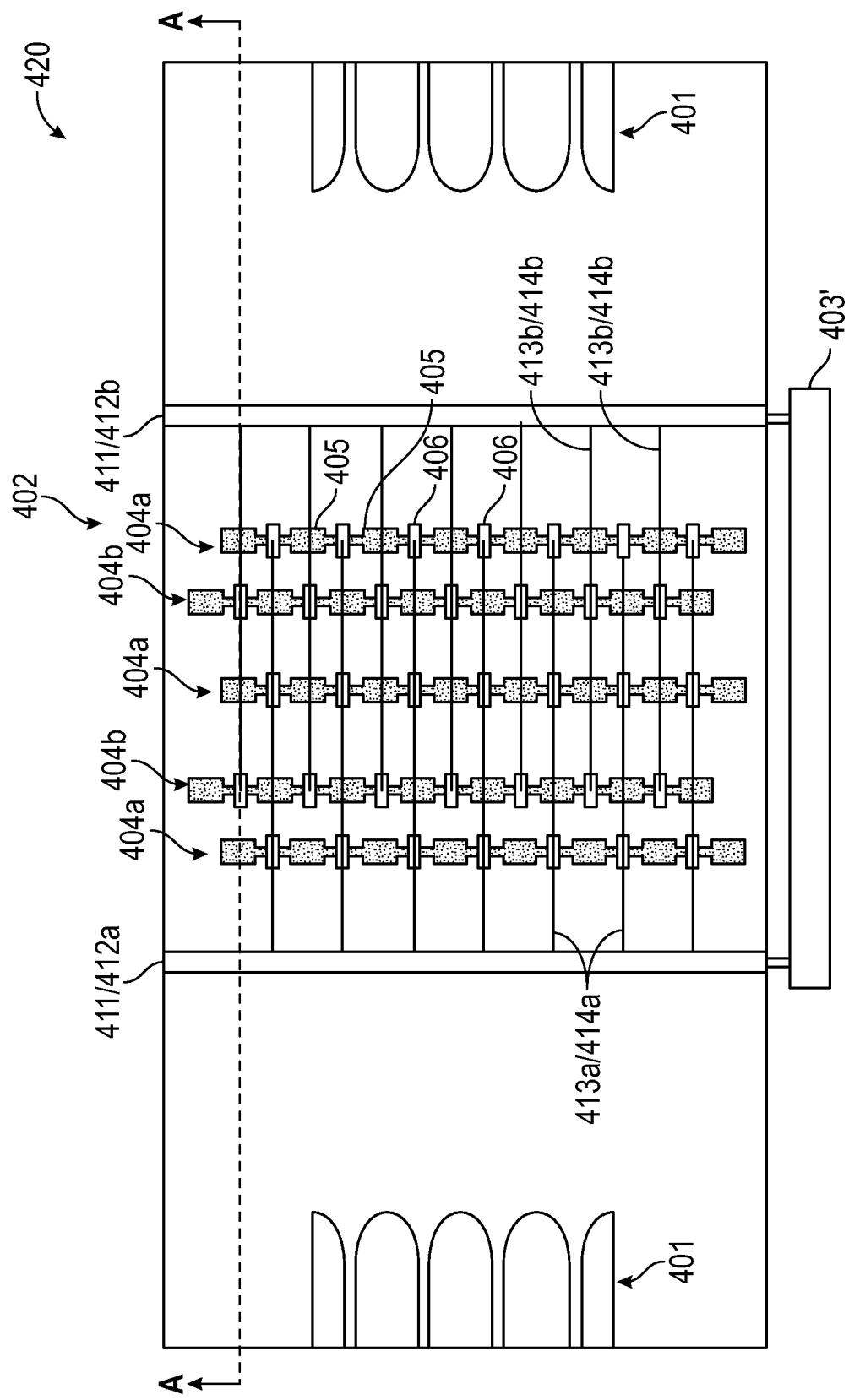
FIG. 13A shows a schematic diagram of another embodiment of the design of the holographic antenna according to the present disclosure.
Figure 13B:
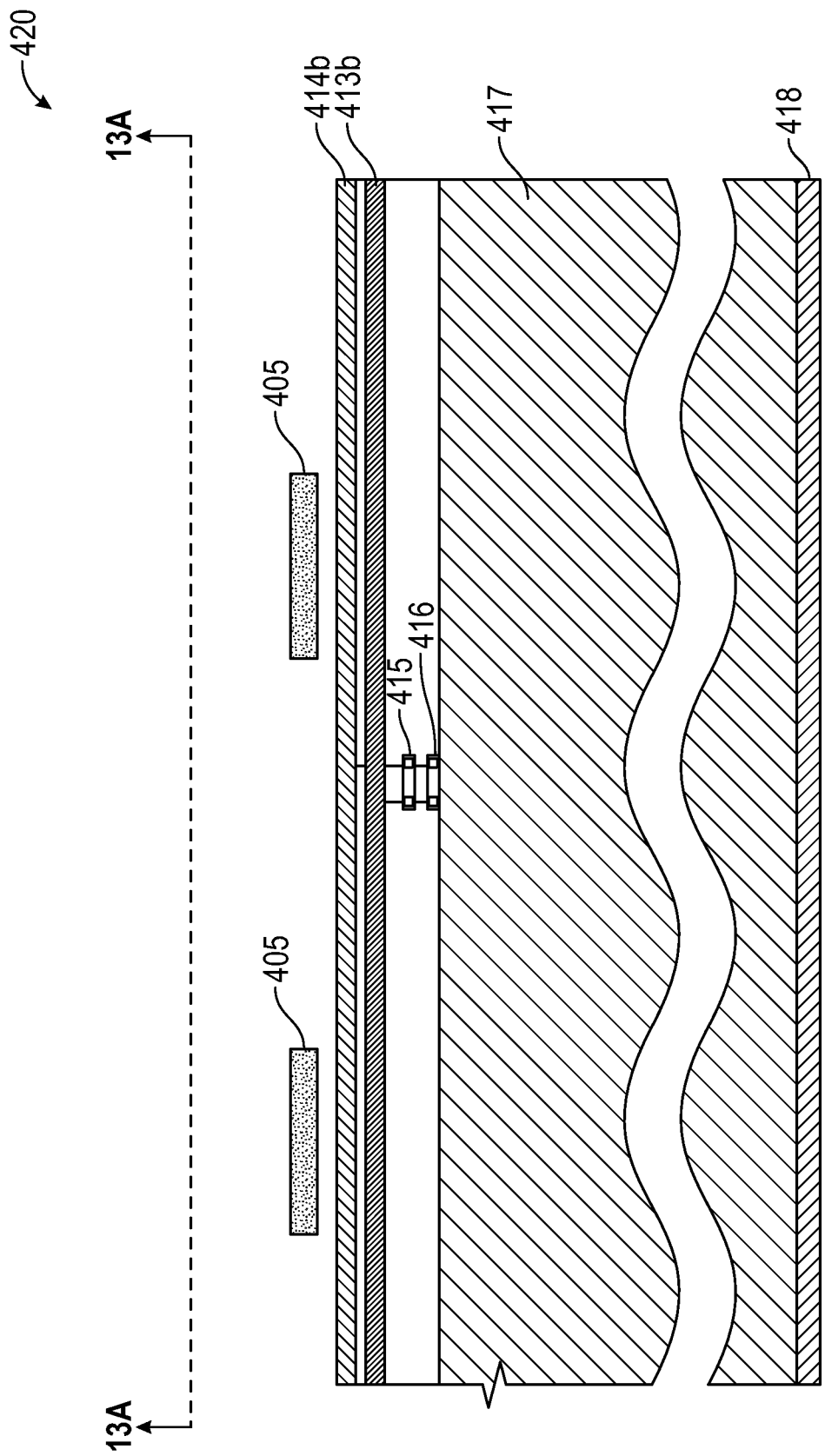
FIG. 13B shows a schematic diagram of another embodiment of the design of the holographic antenna according to the present disclosure.

FIG. 13 shows a schematic diagram of another embodiment of the design of the holographic antenna 420 according to the present disclosure, wherein FIG. 13A shows a top view and FIG. 13B shows a cross-sectional view along A-A. In this embodiment a first Vdd layer 412a, a second Vdd layer 412b, a first ground layer 411 and a second ground layer 418 are provided. The hologram pixels 405 and the assigned transistors 406 of every second hologram stripe 404a (the first hologram stripes 404a) are displaced in a direction parallel to the Vdd layers 412a, 412b with respect to the second hologram stripes 404b. Accordingly, the transistor layers of the first hologram stripes 404a are connected via a first interconnect bias line 413a to ground layer 411 and via a second interconnect bias line 414a to the first Vdd layer 412a, and the transistor layers of the second hologram stripes 404b are connected via a first interconnect bias line 413b to ground layer 411 and via a second interconnect bias line 414b to the second Vdd layer 412. A control and supply unit 403' provides control signals via the Vdd layers 412a, 412b and the second interconnect bias layers 414a, 414b to the transistor switches.

In the holographic antenna 410 shown in FIG. 12 the hologram activation is independent from the power supply. This means that GND and supply voltage (Vdd) is distributed to all transistors. The control lines are used to open and close the switches. Hence, power supply and control lines are decoupled from each other. In the holographic antenna 420 shown in FIG. 13 the Vdd (supply voltage) layers 412a, 412b are used for power supply and for turning on and off the switches. Hence, no additional control lines are needed.

Figure 14A:
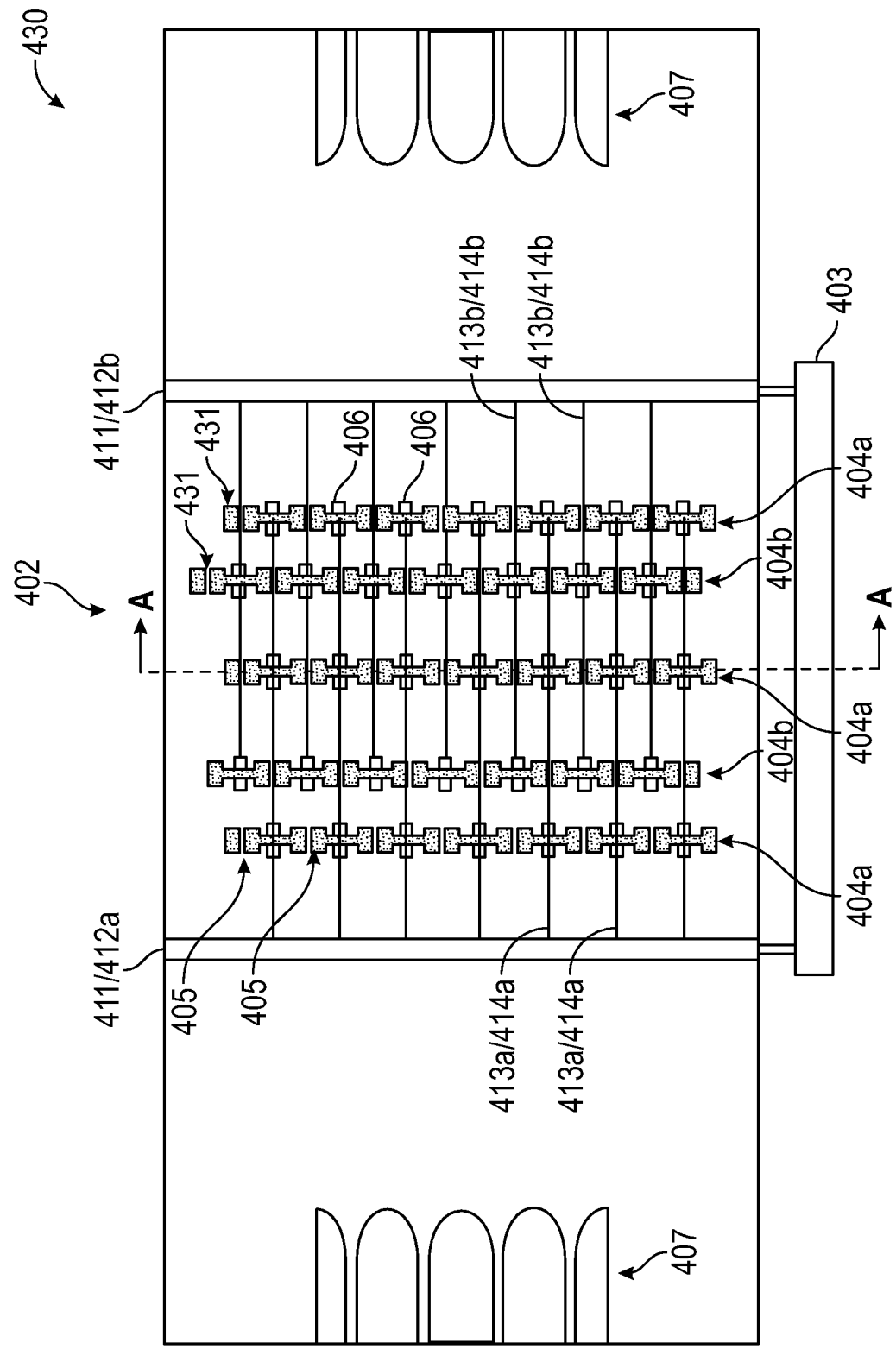
FIG. 14A shows a schematic diagram of another embodiment of the design of the holographic antenna according to the present disclosure.
Figure 14B:
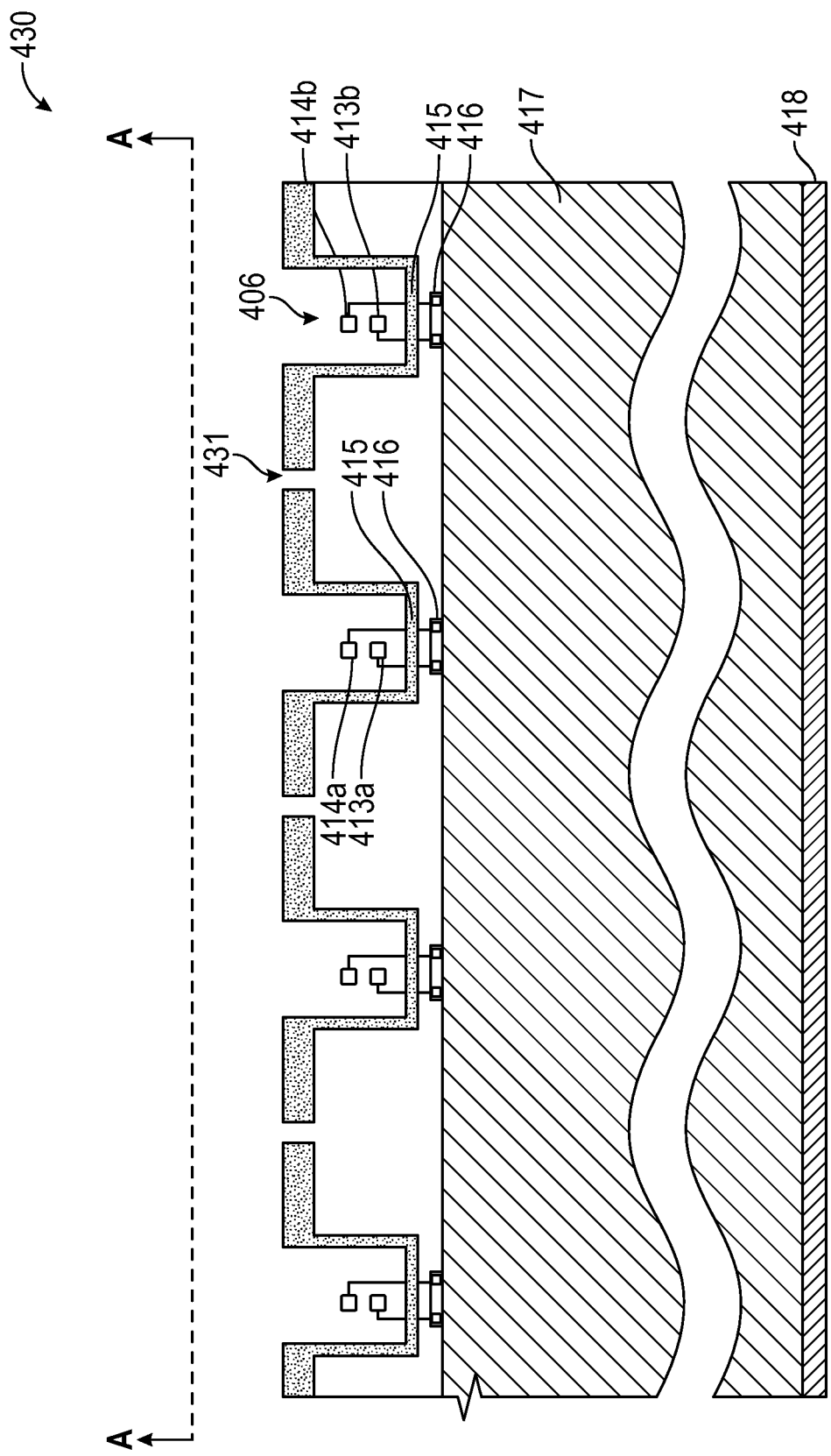
FIG. 14B shows a schematic diagram of another embodiment of the design of the holographic antenna according to the present disclosure.

FIG. 14 shows a schematic diagram of another embodiment of the design of the holographic antenna 430 according to the present disclosure, wherein FIG. 14A shows a top view and FIG. 14B shows a cross-sectional view along A-A. In addition to the elements of the holographic antenna 420 shown in FIG. 13, capacitive coupling via capacitors 431 arranged between the transistors 406 within a holographic stripe 404 is provided.

Figure 15:
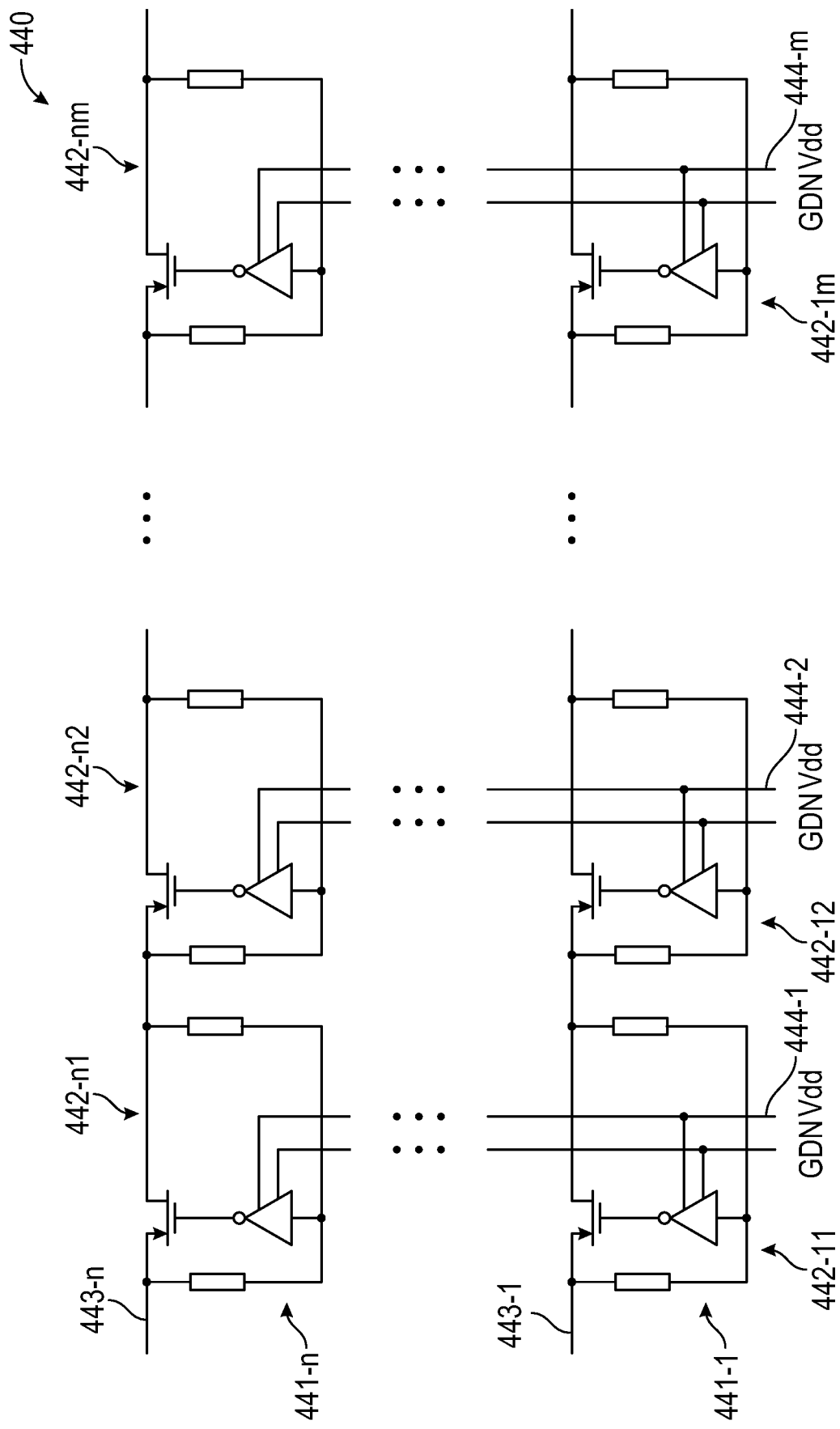
FIG. 15 shows an equivalent circuit of another embodiment of a holographic antenna according to the present disclosure.

FIG. 15 shows an equivalent circuit of another embodiment of a holographic antenna 440 according to the present disclosure, by which a dense hologram arrangement can be realized. FIG. 15 shows two (of n) hologram stripes 441-1, 441-n, each comprising m hologram pixels each having a corresponding transistor switch 442-11, 442-12, 442-1m, 442-n1, 442-n2, 442-nm. Each hologram stripe 441-1, 441-n has its respective control line 443-1, 443-n, provided on the hologram stripe, for providing a control signal for activating the hologram stripe. DC supply lines 444-1, 444-2, 444-m driving the hologram pixels are oriented perpendicular to the electric field of the TE1 mode.

Figure 16:
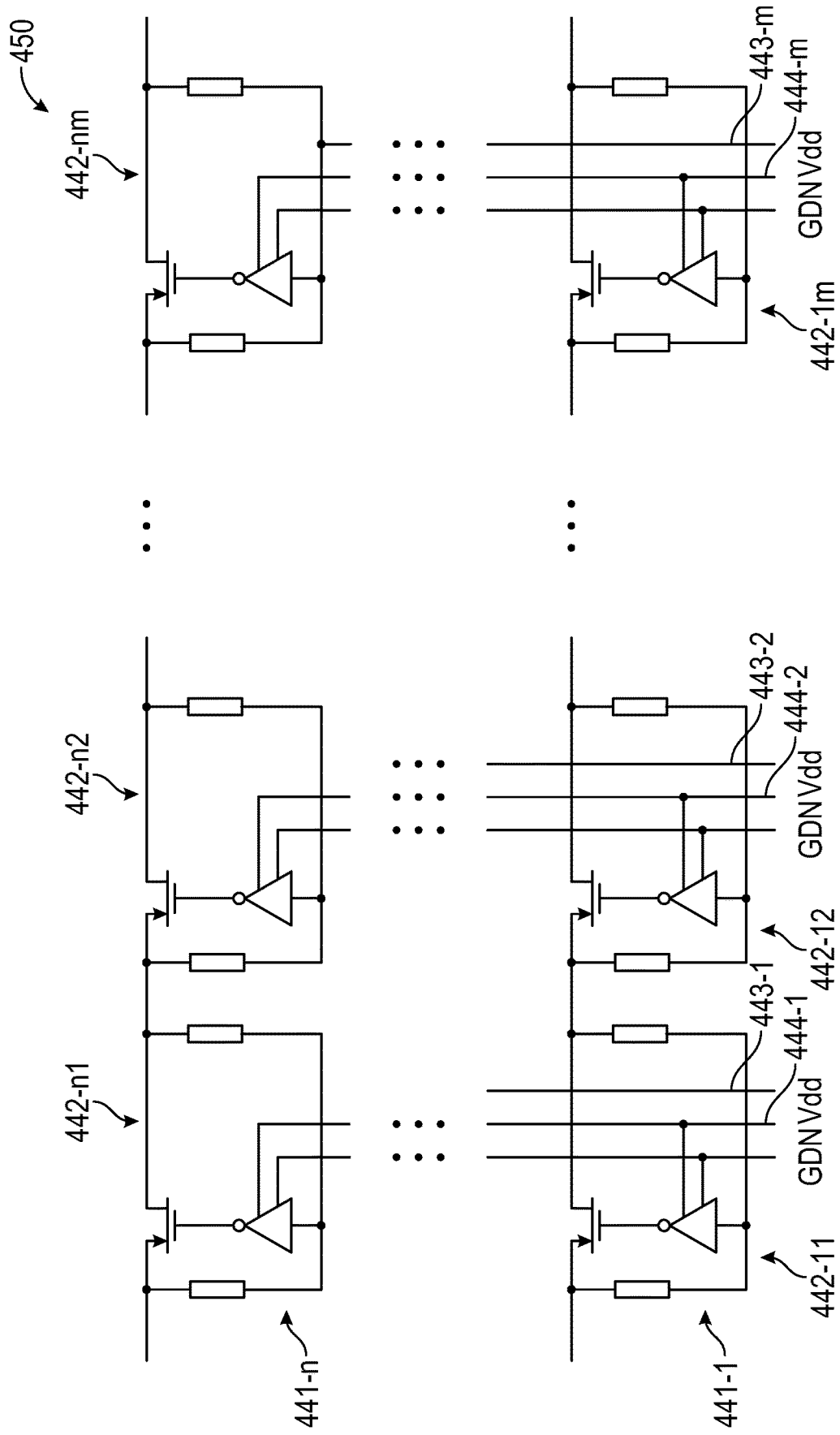
FIG. 16 shows an equivalent circuit of another embodiment of a holographic antenna according to the present disclosure.

FIG. 16 shows an equivalent circuit of another embodiment of a holographic antenna 450 according to the present disclosure, by which a sparse hologram arrangement can be realized. Control lines 443-1, 443-2, 443-m are placed in parallel to the DC supply lines 444-1, 444-2, 444-m. This concept is very effective if switching between two holograms (i.e. two groups of hologram stripes) is sufficient.

Figure 17:
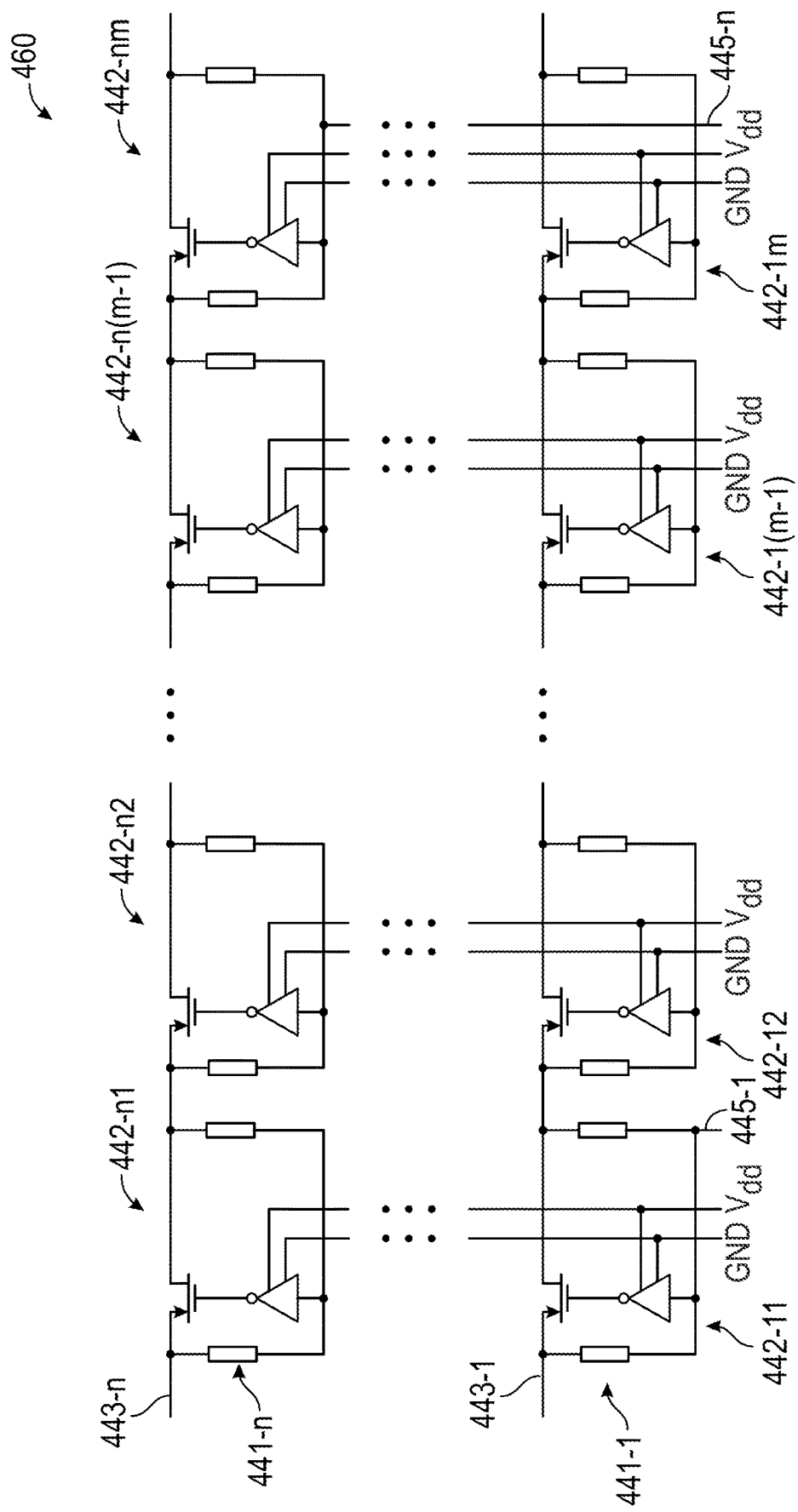
FIG. 17 shows an equivalent circuit of another embodiment of a holographic antenna according to the present disclosure.

FIG. 17 shows an equivalent circuit of another embodiment of a holographic antenna 460 according to the present disclosure, by which a good DC connection and medium amount of hologram stripes can be realized. FIG. 17 shows two (of n) hologram stripes 441-1, 441-n, each comprising m hologram pixels each having a corresponding transistor switch 442-11, 442-12, 442-1(m-1), 442-1m, 442-n1, 442-n2, 442-n(m-1), 442-nm. Control signals are provided on the hologram stripes via control lines 443-1, 443-n. Additionally, control lines 445-1 and 445-n are placed in parallel to the DC supply lines 441-1 and 444-m. Therefore, every n-th switch has two control signals provided by the two separate control lines to ensure signal integrity. This concept is particularly effective if the amount of different holograms is in the order of 3 to 10, but it can also be applied in case of other numbers of holograms.

Figure 18A:
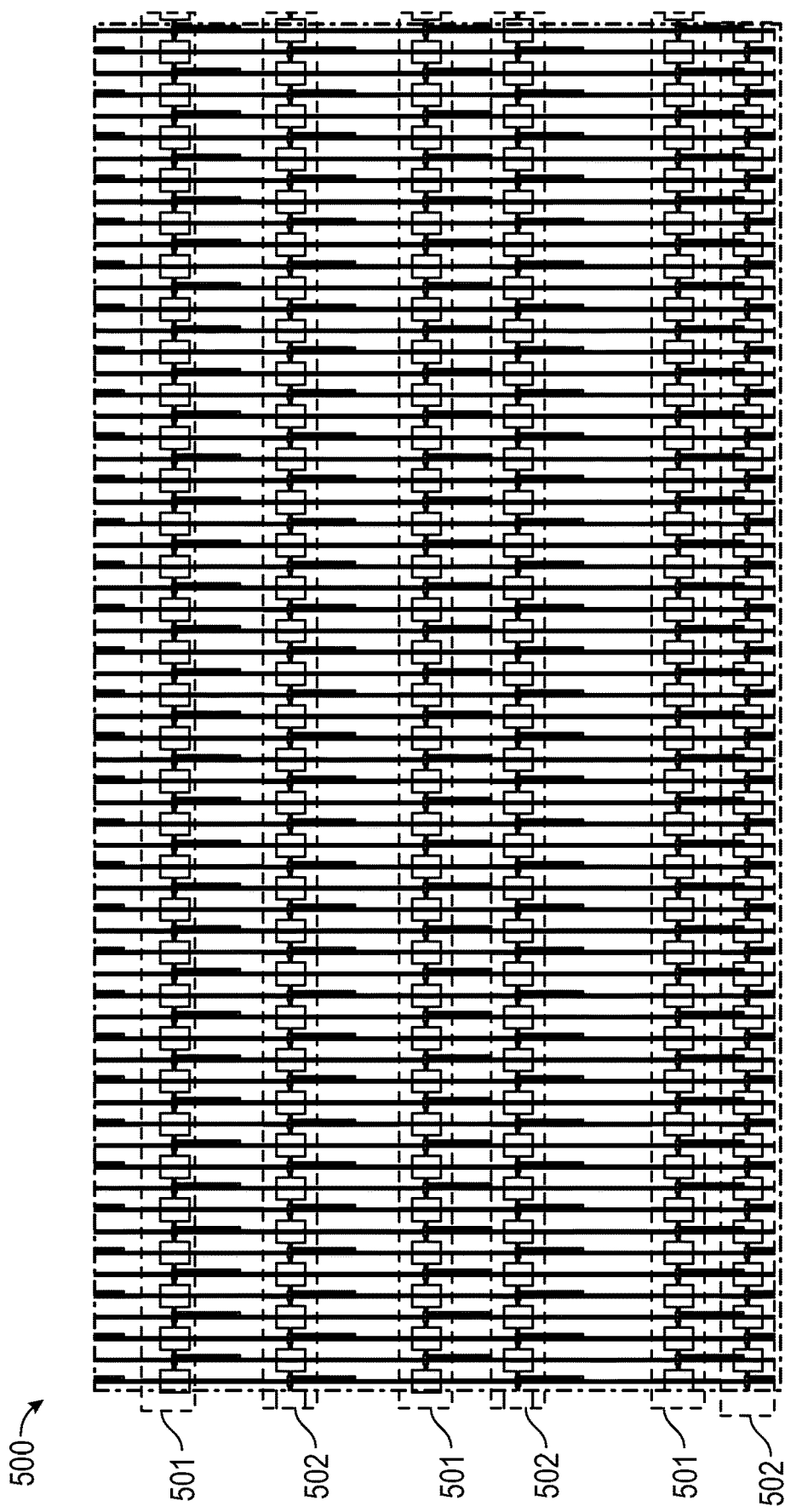
FIG. 18A shows another arrangement of a hologram according to the present disclosure having two holographic patterns.
Figure 18B:
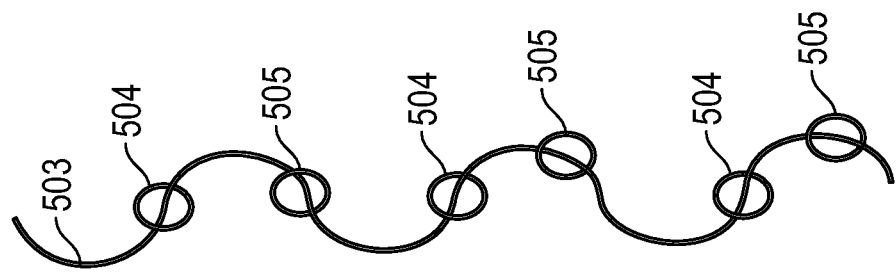
FIG. 18B shows another arrangement of a hologram according to the present disclosure having two holographic patterns.

FIG. 18 shows another arrangement of a hologram 500 according to the present disclosure having two holographic patterns. FIG. 18A shows a top view of the arrangement and FIG. 18B shows a sinusoidal function 503, which corresponds to the wavelength inside the substrate layer 417 (a dielectric layer). The hologram 500 comprises two types of hologram stripes 501 and 502, in which the arrangement of the hologram pixels within the hologram stripes 501 (forming a first holographic pattern) are displaced with respect to the arrangement of the hologram pixels within the hologram stripes 502 (forming a second holographic pattern). Generally, the holographic patterns are controlled so that only one holographic pattern is active at a time during operation.

The hologram pixels of the first holographic pattern (i.e. in the first hologram stripes 501) have one lambda spacing and radiate in boresight direction B (i.e. in the z-direction). The spacing of the hologram pixels of the second holographic pattern (i.e. in the second hologram stripes 502) is less than one lambda leading to a progressive phase shift between the radiating parts of the hologram. Hence, off boresight radiation is achieved by the second holographic pattern. The sinusoidal function 503 indicates this by circles 504 indicating the phase change achieved by the first hologram stripes 501 and circles 505 indicating the phase change achieved by the first hologram stripes 502.

In an exemplary operation, if the hologram is illuminated from both sides by e.g. eight antenna elements, only the first hologram pattern having one wavelength spacing between the hologram pixels is activated. The dual side feeding principle ensures wideband beam pointing along the x-axis without squinting effects. Applying the same phase at all surface wave launchers leads to a boresight radiation direction. Introducing a progressive phase shift (e.g. 0°, 45°, 90° and 135° at four different antenna elements) at the antenna elements of a surface wave launcher (e.g. 0°, 45°, 90° and 135° at four different antenna elements, i.e. 0° at a first antenna element, 45° at a first antenna element, 90° at a first antenna element, and 135° at a first antenna element; or 0°, 50°, 100° and 150°) tilts the radiating beam along the x-axis. Preferably, the same phases are applied at all antenna elements of a surface wave launcher, which are phasing each other.

For two-dimensional beam steering the second hologram stripes 502 having less than one lambda spacing are turned on. Feeding the antenna from the lower side points the beam into the negative y-direction. Feeding the antenna from the upper side beam pointing in positive y-direction is achieved. In an exemplary implementation always a dense hologram radiates. This leads to high efficiencies in off boresight direction compared to other holographic topologies. Applying the second holographic pattern and feeding the antenna elements of a surface wave launcher from one side with a progressive phase shift points the beam into both dimensions.

In another operation beam squinting along the y-axis can be achieved. Waves at every operating frequency radiate with slightly different phase shift from the holographic pattern leading to a beam squint effect. There are e.g. three different options to handle this phenomenon: The operating bandwidth is decreased if the beam points into y-direction (this leads to a significantly reduced range resolution); or the holographic pattern is changed for different frequencies; or signal processing is applied to use the beam squint for angle estimation in y-direction (however, range resolution is again affected).

Figure 19:
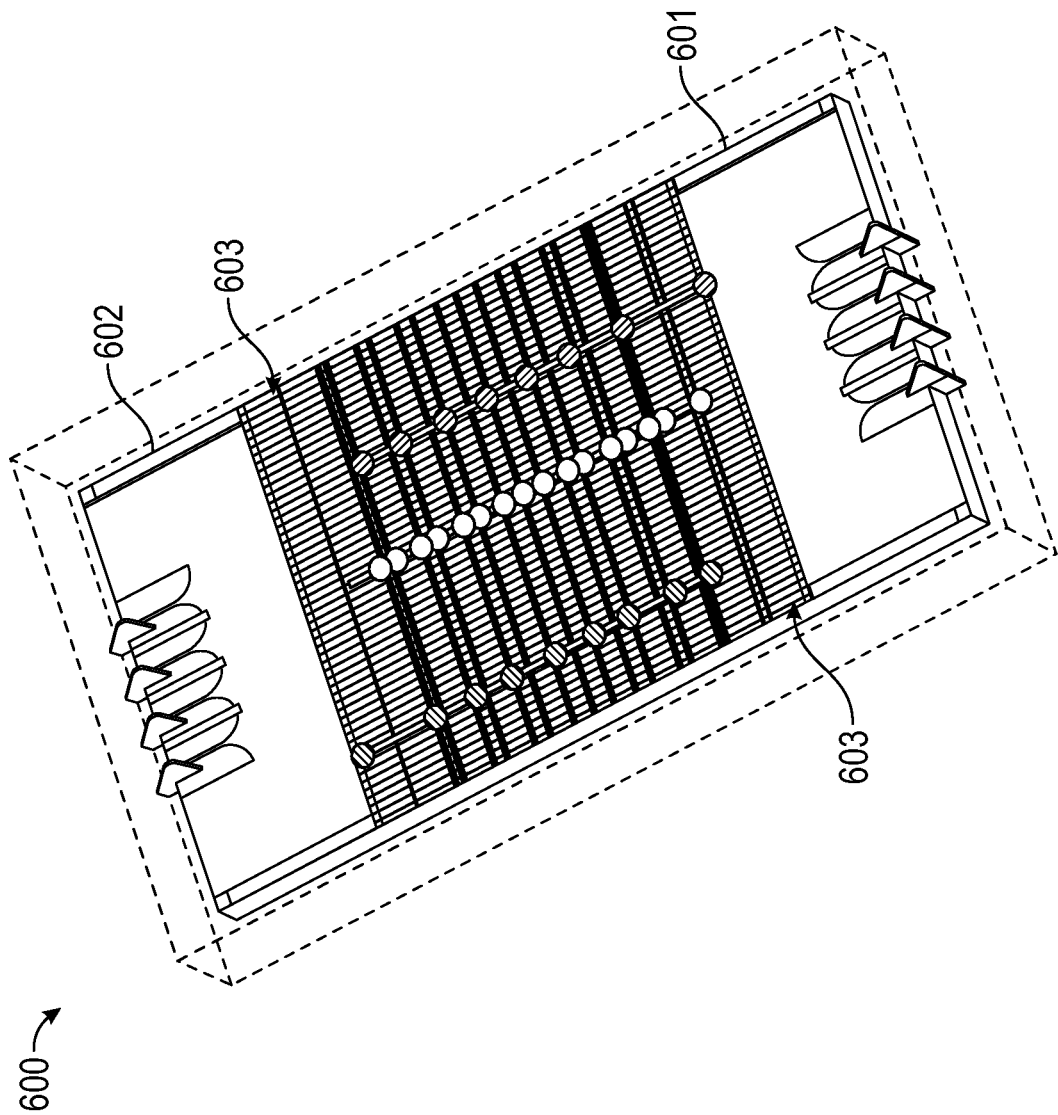
FIGS. 19 and 20 show diagrams of another embodiment of the holographic antenna according to the present disclosure to illustrate the biasing and hologram stripe activation of the antenna.
Figure 20:
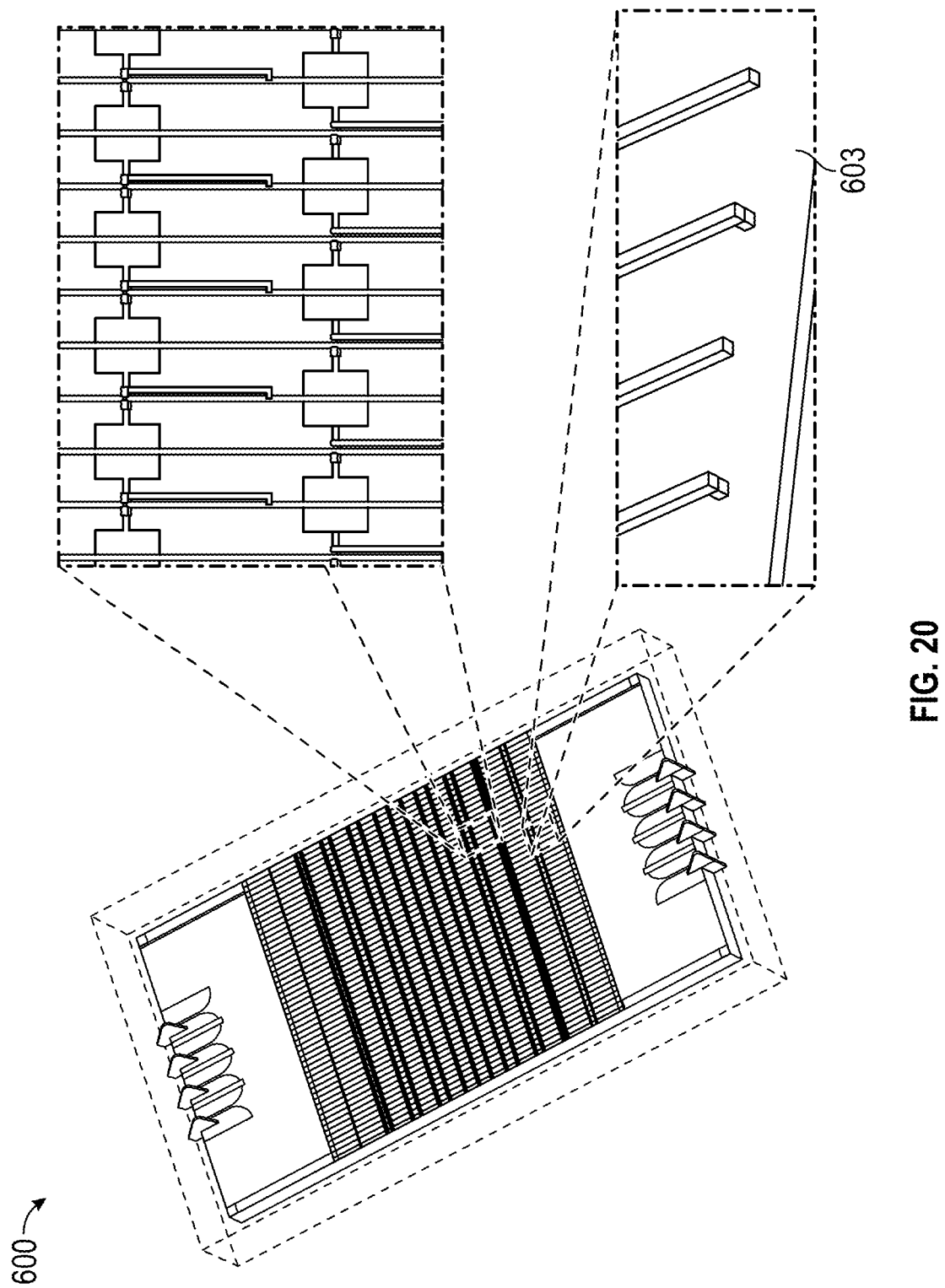

FIGS. 19 and 20 show diagrams of another embodiment of the holographic antenna 600 according to the present disclosure to illustrate the biasing and hologram stripe activation of the antenna. In this embodiment only two holographic patterns are shown. DC voltages are applied from the first and last holographic stripes of the holographic patterns via DC supply lines 601 (supplying the hologram stripes of the first holographic pattern) and 602 (supplying the hologram stripes of the second holographic pattern). A ground line 603 connects to all hologram stripes. For simplicity only one connection is drawn from the outer hologram stripes supporting supply voltage and GND to the holographic patterns. In practice every hologram pixel is connected according to this scheme.

The outer hologram stripes carrying supply voltage and GND are straight lines without any pattern. The position of the hologram pixels on the hologram stripes which correspond to different holographic patterns are shifted slightly against each other. Therefore, bends in the GND and DC lines are avoided. This arrangement guarantees that the field lines of the TE1 mode are oriented perpendicular to the metallic supply grids, and hence no radiation occurs.

Figure 21:
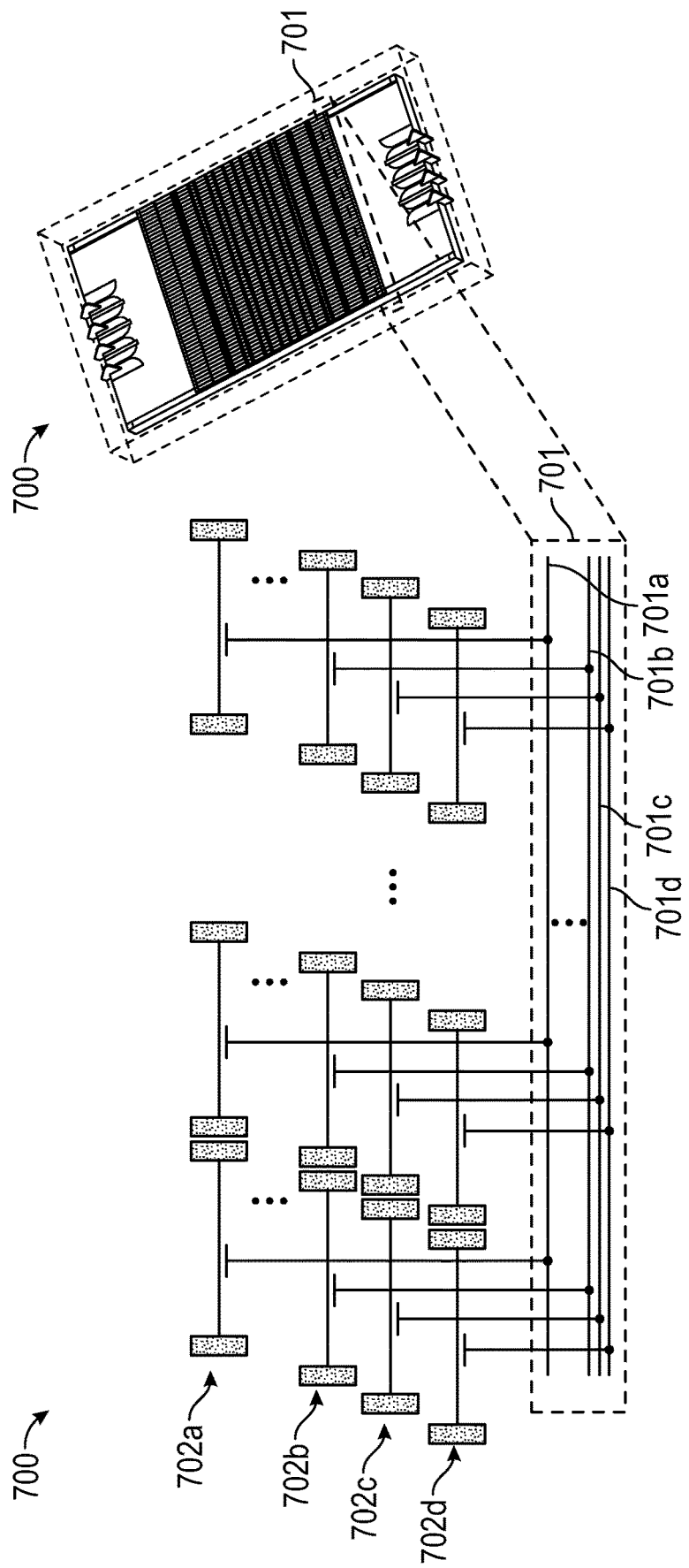
FIG. 21 shows a diagram of another embodiment of the holographic antenna according to the present disclosure to illustrate biasing and hologram stripe activation if the antenna comprises multiple different holographic patterns.

FIG. 21 shows a diagram of another embodiment of the holographic antenna 700 according to the present disclosure to illustrate biasing and hologram stripe activation if the antenna comprises multiple different holographic patterns. The DC supply lines 701 are divided into sub-lines 701a, 701b, 701c, 701d for supplying different holographic patterns 702a, 702b, 702c, 702d. If necessary, GND connection can be provided from this stripe as well.

Figure 22:
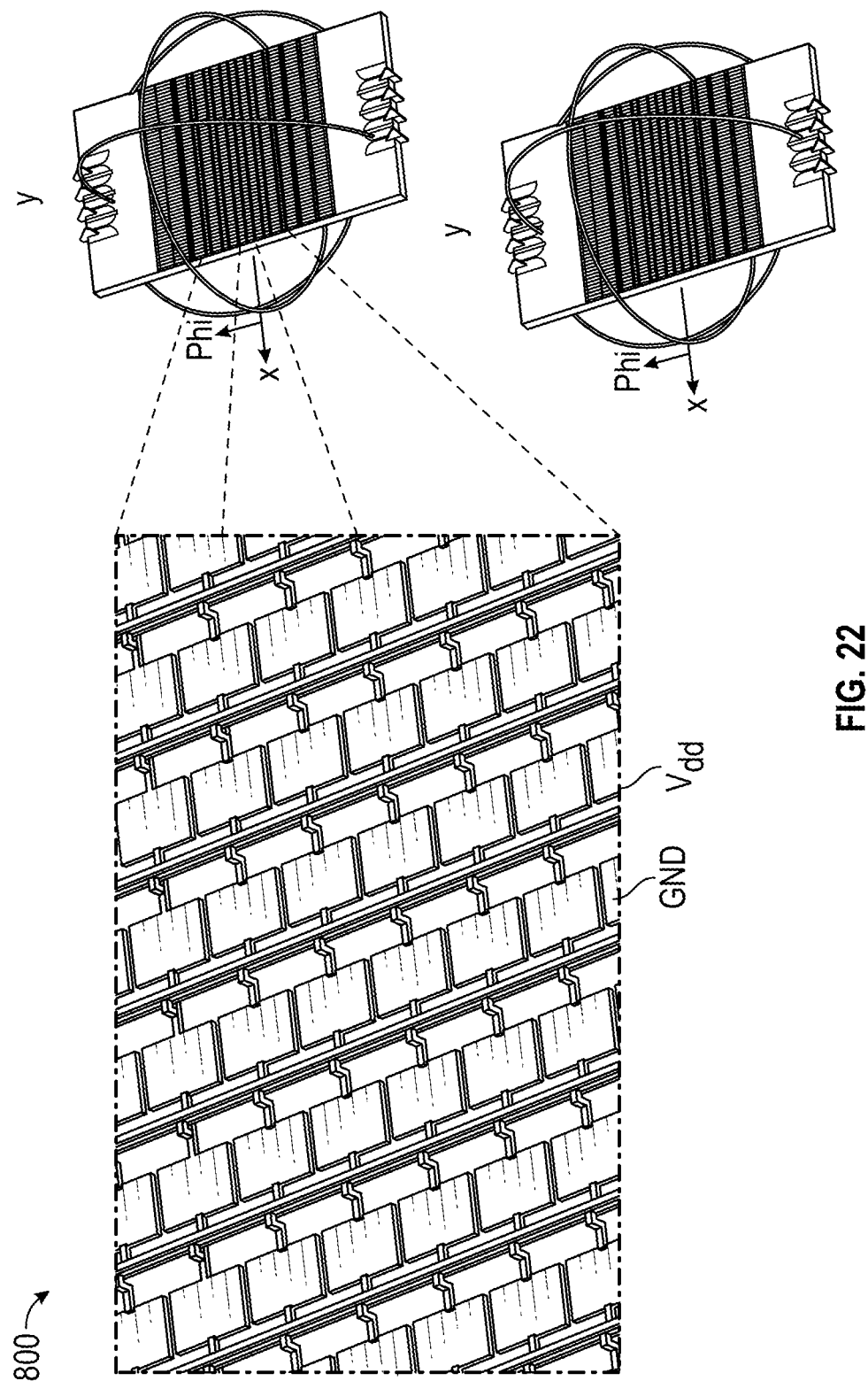
FIG. 22 shows a diagram of another embodiment of the holographic antenna according to the present disclosure having a very high number of hologram stripes.

FIG. 22 shows a diagram of another embodiment of the holographic antenna 800 according to the present disclosure having a very high number of hologram stripes. If the stripe density is high with respect to one wavelength, arbitrary steering can be achieved. Such an arrangement can be used as dense hologram arrangement for activation of different patterns, e.g. during one FMCW (frequency modulated continuous wave) chirp.

The holographic antenna and the holographic antenna arrangement according to the present disclosure provide one or more of the following advantages:

Optical transparent, low loss, and steerable antenna for frequencies above 100 GHz.

Holographic principle with fast two-dimensional beam steering at one operating frequency.

Wideband operation without squinting in boresight direction and along the dimension of the hologram stripe orientation.

The design uses two-dimensional structures only. The antenna without transistors requires only two layers and is consequently a low cost approach.

High aperture efficiency for off-boresight angles due to two individual surface wave launchers and dense hologram.

Excellent tradeoff of antenna and circuit complexity. In an exemplary implementation eight antennas with phase shifters and two DC voltages are used for pixel supply. To achieve the same radiation properties a phased array with more than 32 antennas or a holographic antenna with individual supply of 750 pixels would be required.

Different from known antennas, in embodiments two-dimensional beam steering is achieved by a phased array and a tunable hologram which may be realized on transparent glass and nanowire technology. Vivaldi antenna arrays launch planar transversal electromagnetic (TE) waves on the hologram. If TE modes are applied, the hologram can be formed by lossy electric conductors without considerable performance degradation. Capacitors between the hologram pixels can be seen as a short circuit at the operating frequency. Therefore, parts of the hologram can be turned on and off by transistor switches. Two surface wave launchers can be turned on and off individually. Hence high aperture efficiencies are achieved for off boresight angles due to dense hologram configurations.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

It follows a list of further embodiments of the disclosed subject matter:

1. Holographic antenna comprising:
    an optically transparent substrate;
    a hologram arranged on a first surface of the substrate, the hologram comprising two or more hologram stripes, each having a plurality of linearly arranged hologram pixels, each comprising a switching component;
    a ground plane arranged on a second surface, opposite the first surface, of the substrate;
    one or more surface wave launchers arranged on or in a surface of the substrate, the one or more surface wave launchers being configured to feed a feeding signal in a frequency range above 50 GHz into the hologram; and
    control lines connected to the switching components of the hologram pixels for controlling the hologram pixels individually or in groups.
2. Holographic antenna as defined in any one of the preceding embodiments, wherein the spacing between neighboring hologram pixels of a hologram stripe is substantially identical for all hologram stripes.
3. Holographic antenna as defined in any one of the preceding embodiments, wherein the spacing between neighboring hologram pixels of a hologram stripe is substantially identical for each second hologram stripe and amounts to a first spacing value and the spacing between neighboring hologram pixels of a hologram stripe is substantially identical for the other hologram stripes and amounts to a second spacing value.
4. Holographic antenna as defined in embodiment 3, wherein the first spacing value substantially corresponds to one wavelength of the feeding signal.
5. Holographic antenna as defined in embodiment 4, wherein the second spacing value substantially corresponds to less than one wavelength of the feeding signal.
6. Holographic antenna as defined in any one of the preceding embodiments, wherein the hologram and the ground plane are made of optically transparent material.
7. Holographic antenna as defined in embodiment 6, wherein the hologram and the ground plane are made of indium tin oxide, ITO.
8. Holographic antenna as defined in any one of the preceding embodiments, comprising two surface wave launchers arranged on opposite sides of the hologram, preferably at a distance from the hologram.
9. Holographic antenna as defined in any one of the preceding embodiments, wherein the one or more surface wave launchers are configured to feed electromagnetic waves in a frequency range above 100 GHz into the hologram.
10. Holographic antenna as defined in any one of the preceding embodiments, wherein the one or more surface wave launchers are configured to feed electromagnetic waves in a frequency range from 100 GHz to 300 GHz into the hologram.
11. Holographic antenna as defined in any one of the preceding embodiments, wherein the one or more surface wave launchers each comprises one or more Vivaldi antennas, dipole antennas or Yagi antennas.
12. Holographic antenna as defined in any one of the preceding embodiments, further comprising one or more phase shifters configured to shift the phase of a feeding signal fed by a surface wave launcher into the hologram.
13. Holographic antenna as defined in any one of the preceding embodiments, wherein the one or more surface wave launchers each comprises two or more antennas.
14. Holographic antenna as defined in embodiment 13, further comprising a phase shifter per antenna of one or more antennas of a surface wave launcher configured to individually shift the phase of a feeding signal fed by the respective antenna into the hologram.
15. Holographic antenna as defined in any one of the preceding embodiments, wherein the one or more surface wave launchers are integrated into or arranged on an RF chip.
16. Holographic antenna as defined in any one of the preceding embodiments, further comprising capacitors arranged between neighboring hologram pixels.
17. Holographic antenna as defined in any one of the preceding embodiments, wherein the switching components each comprises an active switching network.
18. Holographic antenna as defined in any one of the preceding embodiments, wherein the switching components each comprises a transparent metal oxide nanowire transistor or a non-transparent or partly transparent transistor or a high-electron-mobility transistor.
19. Holographic antenna as defined in any one of the preceding embodiments, wherein the switching components each comprises
    a switching transistor,
    an inverter coupled with its input to the control line and with its output to the gate of the switching transistor and
    one or more resistors coupled between the input of the inverter and at least one of the source and drain of the switching transistor.
    wherein a resistor and optionally a delay line are arranged in the connection between the source of the switching transistor and the input of the inverter.
20. Holographic antenna as defined in any one of the preceding embodiments, wherein the switching components each comprises
    a switching transistor, and
    one or two control transistors,
    wherein the gates of all transistors are connected to the control line,
    wherein the source of the one or two control transistors are connected to a ground line, and wherein the drain of the one or two control transistors are connected the drain or source, respectively, of the switching transistor.

21. Holographic antenna as defined in any one of the preceding embodiments,
wherein the switching components each comprises
a switching transistor,
a control transistor connected with its drain to the drain of the switching transistor, and
an inverter coupled with its input to the control line and the source of the control transistor and with its output to the gate of the switching transistor and of the control transistor.

22. Holographic antenna as defined in any one of the preceding embodiments, wherein the control line is part of the hologram.

23. Holographic antenna as defined in any one of the preceding embodiments, further comprising a control line per hologram stripe arranged on or within the hologram stripe and connecting to the hologram pixels of the respective hologram stripe.
further comprising DC supply lines for driving the hologram pixels, wherein the DC supply lines are arranged orthogonal to the control lines.

24. Holographic antenna as defined in any one of the preceding embodiments, further comprising a control line and a DC supply line per hologram pixel in a hologram stripe, wherein the control line and the DC supply line of a hologram pixel are arranged in parallel.

25. Holographic antenna arrangement comprising:
a holographic antenna as defined in any one of the preceding embodiments;
a sensing device arranged on the side of the ground plane facing away from the substrate; and
a controller configured to provide control signals for controlling the switching components and the one or more surface wave launchers.

26. Holographic antenna arrangement as defined in embodiment 25, wherein the sensing device includes one or more of a camera, a radar, a solar energy harvesting device, an optical sensing device and an infrared sensing device.

The invention claimed is:
1. A holographic antenna comprising:
an optically transparent substrate;
a hologram arranged on a first surface of the substrate, the hologram comprising two or more hologram stripes, each having a plurality of linearly arranged hologram pixels, each comprising a switching component;
a ground plane arranged on a second surface, opposite the first surface, of the substrate;
one or more surface wave launchers arranged on or in a surface of the substrate, the one or more surface wave launchers being configured to feed a feeding signal in a frequency range above 50 GHz into the hologram; and
control lines connected to the switching components of the plurality of linearly arranged hologram pixels for controlling the plurality of linearly arranged hologram pixels individually or in groups,
wherein each switching component includes
a switching transistor,
an inverter coupled with its input to the control lines and with its output to a gate of the switching transistor, and
one or more resistors coupled between the input of the inverter and at least one of a source and drain of the switching transistor,
wherein a resistor and optionally a delay line are arranged in a connection between the source of the switching transistor and the input of the inverter.

2. The holographic antenna as claimed in claim 1,
wherein a spacing between neighboring hologram pixels of a hologram stripe is the same for all hologram stripes.

3. The holographic antenna as claimed in claim 1,
wherein a spacing between neighboring hologram pixels of a hologram stripe is the same for each second hologram stripe and amounts to a first spacing value and the spacing between neighboring hologram pixels of a hologram stripe is the same for other hologram stripes and amounts to a second spacing value.

4. The holographic antenna as claimed in claim 3,
wherein the first spacing value substantially corresponds to one wavelength of the feeding signal and/or wherein the second spacing value substantially corresponds to less than one wavelength of the feeding signal.

5. The holographic antenna as claimed in claim 1,
wherein the hologram and the ground plane are made of optically transparent material.

6. The holographic antenna as claimed in claim 1,
comprising two surface wave launchers arranged on opposite sides of the hologram at a predetermined distance from the hologram.

7. The holographic antenna as claimed in claim 1,
wherein the one or more surface wave launchers are configured to feed electromagnetic waves in a frequency range above 100 GHz into the hologram and/or in a frequency range from 100 GHz to 300 GHz into the hologram.

8. The holographic antenna as claimed in claim 1,
wherein the one or more surface wave launchers each comprises one or more Vivaldi antennas, dipole antennas or Yagi antennas.

9. The holographic antenna as claimed in claim 1,
further comprising one or more phase shifters configured to shift a phase of a feeding signal fed by a surface wave launcher into the hologram.

10. The holographic antenna as claimed in claim 1,
further comprising a phase shifter per antenna of one or more antennas of a surface wave launcher configured to individually shift a phase of a feeding signal fed by a respective antenna into the hologram.

11. The holographic antenna as claimed in claim 1,
wherein the one or more surface wave launchers are integrated into or arranged on an RF chip.

12. The holographic antenna as claimed in claim 1, further comprising capacitors arranged between neighboring hologram pixels.

13. The holographic antenna as claimed in claim 1,
wherein the switching components each comprises an active switching network or a transparent metal oxide nanowire transistor or a non-transparent or partly transparent transistor or a high-electron-mobility transistor.

14. The holographic antenna as claimed in claim 1,
wherein each switching component comprises
the switching transistor, and
one or two control transistors,
wherein gates of all transistors are connected to the control lines,
wherein a source of the one or two control transistors are connected to a ground line, and
wherein a drain of the one or two control transistors are connected to a drain or source, respectively, of the switching transistor.

15. A holographic antenna, comprising:

an optically transparent substrate;

a hologram arranged on a first surface of the substrate, the hologram comprising two or more hologram stripes, each having a plurality of linearly arranged hologram pixels, each comprising a switching component;

a ground plane arranged on a second surface, opposite the first surface, of the substrate;

one or more surface wave launchers arranged on or in a surface of the substrate, the one or more surface wave launchers being configured to feed a feeding signal in a frequency range above 50 GHz into the hologram; and control lines connected to the switching components of the plurality of linearly arranged hologram pixels for controlling the plurality of linearly arranged hologram pixels individually or in groups, wherein each switching component includes a switching transistor, a control transistor connected with its drain to a drain of the switching transistor, and an inverter coupled with its input to the control lines and a source of the control transistor and with its output to gates of the switching transistor and of the control transistor.

16. The holographic antenna as claimed in claim 1, wherein the control line is part of the hologram.

17. The holographic antenna as claimed in claim 1, further comprising a control line per hologram stripe arranged on or within the hologram stripe and connecting to hologram pixels of a respective hologram stripe, further comprising DC supply lines for driving the hologram pixels of the respective hologram stripe, wherein the DC supply lines are arranged orthogonal to the control lines.

18. The holographic antenna as claimed in claim 1, further comprising a control line and a DC supply line per hologram pixel in a hologram stripe, wherein the control line and the DC supply line of a hologram pixel are arranged in parallel.

19. A holographic antenna arrangement, comprising:

an optically transparent substrate;

a hologram arranged on a first surface of the substrate, the hologram comprising two or more hologram stripes, each having a plurality of linearly arranged hologram pixels, each comprising a switching component;

a ground plane arranged on a second surface, opposite the first surface, of the substrate;

one or more surface wave launchers arranged on or in a surface of the substrate, the one or more surface wave launchers being configured to feed a feeding signal in a frequency range above 50 GHz into the hologram;

control lines connected to the switching components of the plurality of linearly arranged hologram pixels for controlling the plurality of linearly arranged hologram pixels individually or in groups, wherein each switching component includes a switching transistor, an inverter coupled with its input to the control lines and with its output to a gate of the switching transistor, and one or more resistors coupled between the input of the inverter and at least one of a source and drain of the switching transistor, wherein a resistor and optionally a delay line are arranged in a connection between the source of the switching transistor and the input of the inverter;

a sensing device arranged on a side of the ground plane facing away from the substrate; and a controller configured to provide control signals for controlling the switching components and the one or more surface wave launchers.

* * * * *